(12) United States Patent
Nathan et al.

(10) Patent No.: US 10,406,441 B2
(45) Date of Patent: Sep. 10, 2019

(54) SYSTEMS AND METHODS FOR MANAGING A PERSISTENT VIRTUAL AVATAR WITH MIGRATIONAL ABILITY

(71) Applicant: Botanic Technologies, Inc., Emeryville, CA (US)

(72) Inventors: Paco Xander Nathan, Austin, TX (US); Cathi Joann Cox, Los Angeles, CA (US); Florian Thomas Leibert, Am Weigert (DE); Mark Stephen Meadows, Emeryville, CA (US); Jan Susan Mallis, East Ballina (AU)

(73) Assignee: Botanic Technologies, Inc., Emeryville, CA (US)

( * ) Notice: Subject to any disclaimer, the term of this patent is extended or adjusted under 35 U.S.C. 154(b) by 0 days.

(21) Appl. No.: 14/538,192

(22) Filed: Nov. 11, 2014

(65) Prior Publication Data

US 2015/0082205 A1 Mar. 19, 2015

Related U.S. Application Data

(63) Continuation of application No. 11/560,743, filed on Nov. 16, 2006, now abandoned.

(51) Int. Cl.
*G06F 3/048* (2013.01)
*A63F 13/63* (2014.01)
(Continued)

(52) U.S. Cl.
CPC .............. *A63F 13/63* (2014.09); *A63F 13/12* (2013.01); *A63F 13/352* (2014.09); *A63F 13/85* (2014.09);
(Continued)

(58) Field of Classification Search
None
See application file for complete search history.

(56) References Cited

U.S. PATENT DOCUMENTS 5,880,731 A * 3/1999 Liles ............... G06F 3/0481
345/473
6,219,045 B1 4/2001 Leahy et al.
(Continued)

OTHER PUBLICATIONS

U.S. Appl. No. 15/481,236, of Nathan, P., et al., filed Apr. 6, 2017.
(Continued)

*Primary Examiner* — Hua Lu
(74) *Attorney, Agent, or Firm* — Perkins Coie LLP

(57) ABSTRACT

Systems and methods for managing a virtual avatar with migrational ability, and brokering information, are provided. The persistent avatar exists in a plurality of virtual environments and includes attributes generated by an attribute generator, an enabler for enabling virtual environments to access the stored attribute data, and a migrator for allowing the avatar to migrate from one virtual environment to another while the attributes of the persistent avatar remain substantially constant. The enabler utilizes at least one client based on protocol suite. Stored attribute data is modifiable by experiences in any virtual environment. User of the persistent avatar is notified when events occur in any virtual environment, or within real life, by monitoring for events with a monitor, assessing importance of the event with an assessor, and notifying the owner with an informer of the event if it exceeds a threshold of importance.

23 Claims, 26 Drawing Sheets

(51) Int. Cl.
  *A63F 13/352* (2014.01)
  *A63F 13/85* (2014.01)
  *A63F 13/30* (2014.01)
  *G06F 3/0481* (2013.01)
  *H04L 29/08* (2006.01)

(52) U.S. Cl.
  CPC .......... *G06F 3/04815* (2013.01); *H04L 67/22* (2013.01); *A63F 2300/51* (2013.01); *A63F 2300/5553* (2013.01); *A63F 2300/6009* (2013.01); *A63F 2300/6018* (2013.01)

(56) References Cited

U.S. PATENT DOCUMENTS

| | | | |
|---|---|---|---|
| 6,570,555 B1* | 5/2003 | Prevost | G06F 3/01 345/156 |
| 7,249,139 B2 | 7/2007 | Chuah et al. | |
| 7,311,608 B1 | 12/2007 | Danieli et al. | |
| 8,547,401 B2 | 10/2013 | Mallinson et al. | |
| 9,253,183 B2 | 2/2016 | Nathan et al. | |
| 9,635,008 B2 | 4/2017 | Nathan et al. | |
| 2001/0019330 A1* | 9/2001 | Bickmore | G06T 13/40 345/473 |
| 2001/0037316 A1 | 11/2001 | Shiloh et al. | |
| 2002/0082065 A1 | 6/2002 | Fogel et al. | |
| 2002/0082077 A1 | 6/2002 | Johnson et al. | |
| 2003/0046689 A1* | 3/2003 | Gaos | G06Q 30/02 725/34 |
| 2003/0125973 A1 | 7/2003 | Mathews et al. | |
| 2003/0177187 A1 | 9/2003 | Levine et al. | |
| 2003/0179222 A1* | 9/2003 | Noma | G06F 16/954 715/700 |
| 2003/0216962 A1 | 11/2003 | Heller et al. | |
| 2004/0075677 A1* | 4/2004 | Loyall | G06F 3/011 715/706 |
| 2004/0097287 A1 | 5/2004 | Postrel | |
| 2004/0179039 A1* | 9/2004 | Blattner | G06T 13/40 715/758 |
| 2005/0114397 A1* | 5/2005 | Doshi | H04L 41/00 |
| 2005/0193055 A1* | 9/2005 | Angel | G06Q 30/02 709/202 |
| 2005/0265550 A1 | 12/2005 | Tuyls et al. | |
| 2005/0280660 A1* | 12/2005 | Seo | H04M 1/72544 345/629 |
| 2006/0058014 A1* | 3/2006 | Seo | H04W 4/00 455/418 |
| 2006/0074671 A1* | 4/2006 | Farmaner | G10L 15/193 704/257 |
| 2006/0128460 A1 | 6/2006 | Muir et al. | |
| 2006/0143569 A1* | 6/2006 | Kinsella | G06Q 10/107 715/752 |
| 2006/0161435 A1 | 7/2006 | Atef et al. | |
| 2006/0181535 A1* | 8/2006 | Watt | A63F 13/10 345/473 |
| 2006/0184355 A1* | 8/2006 | Ballin | G06F 3/011 704/8 |
| 2006/0235790 A1 | 10/2006 | Jung et al. | |
| 2006/0247055 A1 | 11/2006 | O'Kelley et al. | |
| 2006/0258462 A1* | 11/2006 | Cheng | G07F 17/32 463/42 |
| 2006/0294465 A1* | 12/2006 | Ronen | H04M 1/576 715/706 |
| 2007/0112624 A1 | 5/2007 | Jung et al. | |
| 2007/0203693 A1* | 8/2007 | Estes | G06N 5/022 704/9 |
| 2008/0020361 A1* | 1/2008 | Kron | G09B 23/28 434/262 |
| 2008/0059570 A1* | 3/2008 | Bill | G06Q 10/10 709/203 |
| 2008/0090553 A1* | 4/2008 | Wan | H04L 51/066 455/413 |
| 2008/0091692 A1* | 4/2008 | Keith | G06F 16/958 |
| 2008/0120558 A1 | 5/2008 | Nathan et al. | |
| 2008/0163075 A1* | 7/2008 | Beck | H04L 51/12 715/759 |
| 2011/0148916 A1* | 6/2011 | Blattner | G06Q 10/107 345/619 |

OTHER PUBLICATIONS

U.S. Appl. No. 11/694,156, of Nathan, P., et al., filed Mar. 30, 2007.
Restriction Requirement dated Aug. 29, 2017 for U.S. Appl. No. 11/560,743 of Nathan, P., et al. filed Nov. 16, 2006.
Notice of Allowance dated Sep. 30, 2015 in U.S. Appl. No. 14/542,661, of Nathan, P., et al, filed Nov. 17, 2014.
Non-Final Office Action dated Apr. 9, 2010 in U.S. Appl. No. 11/694,156, of Nathan, P., et al, filed Dec. 26, 2007.
Non-Final Office Action dated Dec. 30, 2016 in U.S. Appl. No. 15/012,747, of Nathan, P., et al, filed Feb. 1, 2016.
Notice of Allowance dated Mar. 1, 2017 in U.S. Appl. No. 15/012,747, of Nathan, P., et al, filed Feb. 1, 2016.
Jorissen et al., "Dynamic Interactions in Physically Realistic Collaborative Virtual Environments," Dec. 2005, IEEE Transactions on Visualization and Computer Graphics, vol. 11, No. 6, pp. 649-660.
Notice of Allowance dated Jul. 23, 2018 in U.S. Appl. No. 15/481,236, of Nathan, P., et al, filed Apr. 6, 2017.

\* cited by examiner

SYSTEMS AND METHODS FOR MANAGING A PERSISTENT VIRTUAL AVATAR WITH MIGRATIONAL ABILITY

BACKGROUND OF THE INVENTION

This application is a continuation application of application Ser. No. 11/560,743, filed on Nov. 16, 2006, entitled "Systems and Methods for Managing a Persistent Virtual Avatar with Migrational Ability" which is hereby fully incorporated by reference.

The present invention relates to a system and method for managing a persistent virtual avatar, and more particularly a persistent virtual avatar that has the ability to migrate between virtual environments, and have cross-membrane capacity. Such an avatar is useful in conjunction with Massively Multiplayer Online Games (MMOGs), virtual worlds, online social networks, virtual classrooms, virtual healthcare advice, and virtual personal assistants. Currently most virtual environments are compiled in a unique and specific language. The fact that the virtual worlds are disparate, with dissimilar native languages makes the movement of data from one virtual environment to another technically difficult.

As known to those skilled in the art, an avatar is a virtual representation of an individual within a virtual environment. Avatars often include physical characteristics, statistical attributes, inventories, social relations, emotional representations, and weblogs (blogs) or other recorded historical data. Avatars may be human in appearance, but are not limited to any appearance constraints. Avatars may be personifications of a real world individual, such as a Player Character (PC) within a MMOG, or may be an artificial personality, such as a Non-Player Character (NPC). Additional artificial personality type avatars include personal assistants, guides, educators, answering servers and information providers. Additionally, some avatars may have the ability to be automated some of the time, and controlled by a human at other times. Such Quasi-Player Characters (QPCs) may perform mundane tasks automatically, but more expensive human agents take over in cases of complex problems.

Avatars often are the products of much labor and effort by their authors, since they often provide a unique creative outlet for the author and self-expression. The avatar is a representation of the author, not simply a tool, and as such the author's desires and essence is often reflected in the avatar. As a result, the author is often emotionally attached with her avatar, and great effort may be spent perfecting the Avatar's appearance, equipment, attributes and statistics.

Currently, in most situations, an individual owns a personal avatar that is capable of existing in one virtual environment. These virtual environments are typically hosted and maintained by companies. Additionally, these companies maintain an interface that allows the individual to control her avatar within the virtual environment. This interface utilizes the native language of the virtual environment.

Currently, the online realm is divided into three major categories: Massively Multiplayer Online Games, virtual social worlds, and web communities. In some instances the distinction between these virtual categories may become blurred as certain virtual environments have characteristics of a combination of categories. Additionally, Real World (RW) data is increasingly being digitized and may bleed into the traditional three categories as RW representations. Moreover, telecommunication devices may also be considered a medium for virtual text-based environments. However, with the advances in cellular phone, Personal Digital Assistants (PDA) and BlackBerry devices these virtual environments may evolve significantly in the future.

The number of active subscribers to MMOGs is at least 10 million people. Each person pays $15 and up a month to play these games, and maybe and additional 20 million people login occasionally. Estimates are that players spent about $1 billion in real money in 2005 on virtual goods and services for MMOGs combined. Moreover, at least 1.5 million people subscribe to virtual worlds. In January, 2006, inside one such virtual social world, people spent nearly $5 million in some 4.2 million transactions buying or selling clothes, buildings, and the like. Moreover, participants in web communities number in the multiple tens of millions.

Often participants have accounts in multiple different virtual environments. And whereas the subscription to these various virtual environments may be enormous, there is little to no connectivity between different virtual environments; largely due in part to disparate native languages and jealous territoriality by the virtual environments themselves. A character in a MMOG is unable to make an appearance within a second MMOG, much less in a virtual social world. There is strong user pressure, however, to allow assets and information from one virtual environment into another virtual environment. Examples of this include the emergence of weblogs, or blogs, discussing the exploits of a MMOG within a web community. Convergence describes this joining of virtual environments. Similarly, crossing the membrane, or cross-membrane, describes the movement of Real World data into a virtual environment, and vice versa.

The frontier of convergence and cross-membrane offers many possibilities for mapping, exploring, and populating what is unknown territory. Given the effort put into the creation of avatars, and the emotional attachments associated with them, it is logical that a paramount issue of convergence and cross-membrane will be the persistence of these avatars between virtual environments. Such movement by an avatar between multiple virtual environments is known as migration. Systems for managing persistent avatars across virtual environments as they migrate do not currently exist.

Additionally, with the migration of avatars across virtual environments it will become necessary that the users' information is available to the new environment. The avatar may be halted in her migration, and prompted for the necessary information as migration occurs. However such a system is not conducive to seamless migration between virtual environments. As such, a system of ranking the trust level of a specific virtual environment, and brokering user information dependent upon such a trust rank will be beneficial.

Lastly, a natural extension of migration will include the ability to monitor all virtual environments, as well as the real world, for events that the user would take interest in. The user may then be notified of the significant event regardless of the user's virtual or physical location.

It is therefore apparent that an urgent need exists for a system and method for managing virtual avatars that integrates the ability to migrate between worlds, broker user information and containing cross-membrane capabilities. This system would be able to provide highly persistent virtual personalities for personal and corporate use.

SUMMARY OF THE INVENTION

To achieve the foregoing and in accordance with the present invention, systems for managing a virtual avatar with migrational ability, and methods for providing migration and managing the virtual avatar, and brokering information, are provided. Such systems and methods are useful for providing a highly persistent virtual avatar with seamless migratory abilities.

The persistent avatar may exist in a plurality of virtual environments and include attributes. The persistent avatar may be a character, non-player character, quasi-player character, agent, personal assistant, personality, guide, educator or representation. The plurality of virtual environments includes at least one of online games, social networks, web communities, shared simulations based on user-created content, and virtual overlays on physical world data. The persistent avatar is associated with a user.

The method and system for managing the persistent avatar includes enabling virtual environments to access the attributes. Additionally, by allowing multiple virtual environments to access the attributes the avatar may migrate from one virtual environment to another. An attribute generator generates the attribute data. A preexisting avatar may be used by the attribute generator to create the attribute data, or pre-selectable attributes may be used to generate the data from scratch. Attributes of the persistent avatar may include appearance, memories, personality, emotional attributes, intelligence attributes, physical attributes, social attributes, and avatar statistics.

Any virtual environment is enabled to access the stored attribute data. An enabler is utilized to enable this access by decoding the attributes. The enabler utilizes at least one client based on protocol suite. Another virtual environment may then dynamically access the stored attribute data by utilizing the enabler. In such a fashion the persistent avatar may migrate from the first virtual environment to the second virtual environment while the attributes of the persistent avatar remain substantially constant.

The attributes may be modified by experiences in any virtual environment. The enabler encodes data produced from experiences in the virtual environment. The data is processed and modifies the attributes.

The user of the persistent avatar may be notified when events occur in any virtual environment or within real life. The method of notifying the user may include monitoring for events, assessing importance of the event, and notifying the user of the event if it exceeds a threshold of importance. The user's preferences, degree of impact on user, scope of event, duration of event, and degree of impact on user's social network may be queried in order to help assess the importance of the event. The user may be notified by sending a message to the persistent avatar if it is in use by the user, sending an electronic mail message to the user, sending an instant message to the user, and sending a short message service to the user. A monitor may be used for monitoring for events. An assessor assesses the importance and an notifier notifies the user of the event.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, one embodiments will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates to systems and methods for managing persistent virtual avatars, and more particularly persistent virtual avatars that have the ability to migrate, and have cross-membrane capacity. Such avatars are useful in conjunction with Massively Multiplayer Online Games (MMOGs), virtual social worlds and online web communities, generically referred to as "virtual environments". All virtual environments may be collectively referred to as the "virtual universe". A persistent avatar may be a character, non-player character, quasi-player character, agent, personal assistant, personality, guide, representation, educator or any additional virtual entity that requires persistence between virtual environments. In a society of ever increasing reliance and blending between real life and our virtual lives, the ability to migrate seamlessly between virtual environments with a substantially constant set of attributes is highly desirable and advantageous.

Figure 1A:
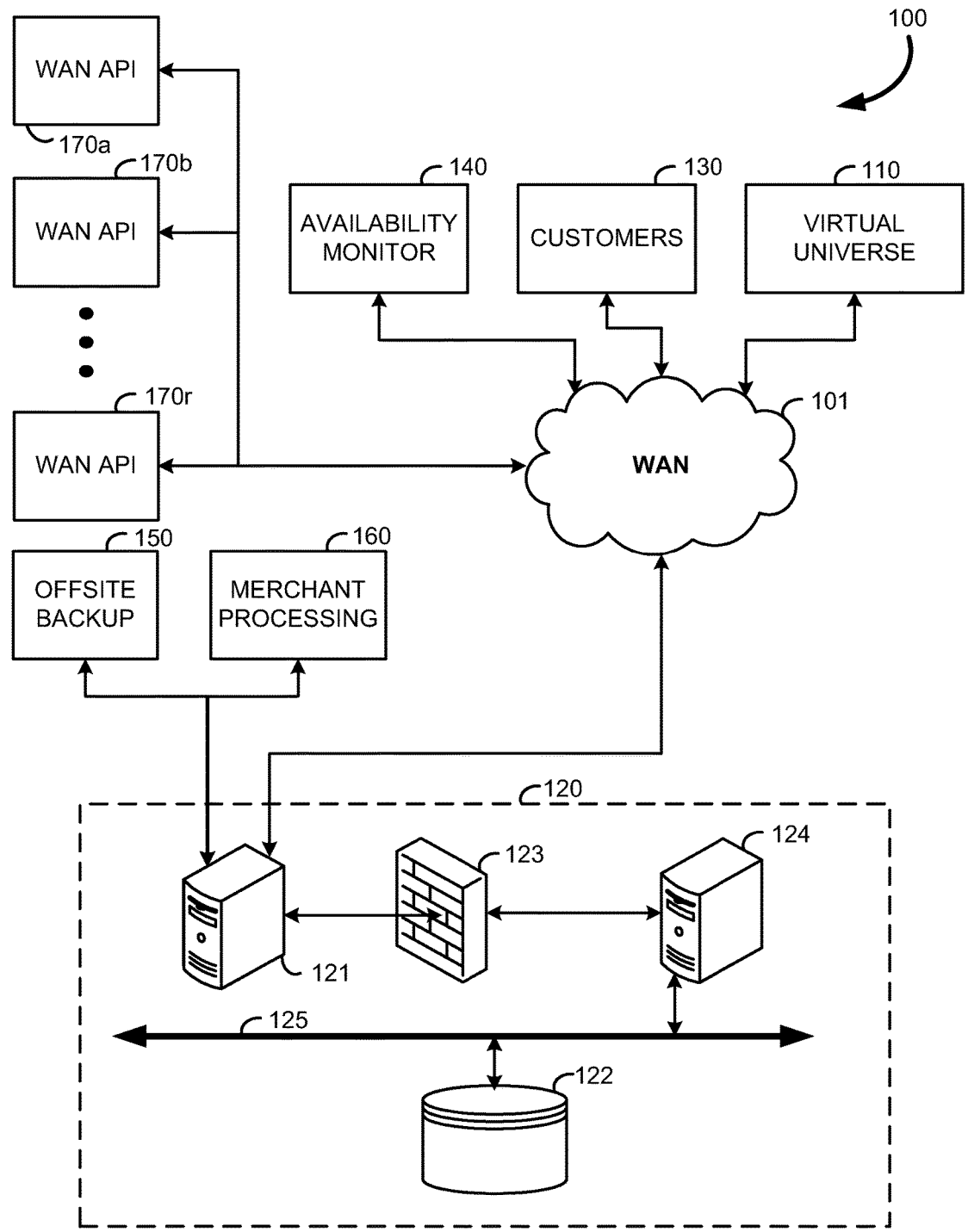
FIG. 1A shows a schematic block diagram illustrating a persistent avatar management system in accordance with an embodiments of the present invention.

To facilitate discussion, FIG. 1A shows a schematic block diagram 100 illustrating a persistent avatar management system in accordance with an embodiment of the present invention. A Wide Area Network (WAN) 101 provides a medium for all other components to communicate and have access to one another. In some embodiments the WAN 101 may be the Internet, however any WAN may be used as is known by those skilled in the art. Network connections are made through 10/100/1000 Megabit/sec Ethernet cable, although other network wiring technologies, such as high speed optical cable, may also be used. Additionally, Wireless mesh networks may also be used to couple wired networks, network devices, or access points, as is well known by those skilled in the art.

Virtual Universe 110 is coupled to the WAN 101 for access by the Customers 130. The term Customers 130 includes users who use the persistent avatar, and owners who own the persistent avatars. In some embodiments the user of a particular avatar may also be the Avatar's owner. Alternatively, the owner and the user may be separate individuals. Moreover, the user and owner may include multiple individuals or organizations, such as a corporation. In some embodiments, some or all of these permutations of user and owner may constitute the Customers 130. The Virtual Universe 110 may be accessed by the persistent avatars. Once accessed, the persistent avatar may engage in the Virtual Universe 110 in at least all capacities that a native avatar is able. Additionally, the persistent avatar may communicate with other virtual environments within the Virtual Universe 110, or with the real world.

In some embodiments, an Availability Monitor 140 also may couple to the WAN 101. The Availability Monitor 140 may provide constant monitoring of critical services for troubleshooting and downtime reduction purposes. In many cases, the Availability Monitor 140 may be located in many different geographical locations, so that a "triangulation" of service availability problems may be preformed.

A Network Operation Center (NOC) 120 includes at least one Public Server 121 coupled to an Internal Server 124 through a Firewall 123. The Internal Server 124 may couple to a Local Area Network (LAN) 125. The Firewall 123 limits assess by Customers 130 and unauthorized parties into the LAN 125. Additionally, communication between the Public Server 121 and the Internal Server 124 through the Firewall 123 may utilize Network Address Translation (NAT) as is well known by those skilled in the art. Public Server 121, Firewall 123 and Internal Server 124 may be separate physical entities. Alternatively, the Public Server 121, Firewall 123 and Internal Server 124 may be housed within a single server. Additionally, Database 122 is coupled to the LAN 125. The Database 122 may include customer account information, persistent avatar attribute data and avatar conversational data for data mining. Due to the vast amount of avatar data within the Database 122 a data management system for infrequently accessed information may be utilized to increase Database 122 performance. Additional components may be coupled to the LAN 125 that are not shown. These components may include printers, additional databases, additional servers, telephone networks, fax, routers or other network devices.

The NOC 120 may be in a single location, however in some embodiments the NOC 120 may be distributed over multiple locations for increased reliability and efficiency, and reduced vulnerability to NOC 120 disruption and disaster.

The Public Server 121 couples the NOC 120 to the WAN 101. Additionally, in some embodiments, a Merchant Processing 150 and Offsite Backup 160 may independently couple to the Public Server 121. Alternatively, Merchant Processing 150 and Offsite Backup 160 may couple to the Public Server 121 through the WAN 101. Due to the variability of viable currencies existing within Virtual Universe 110 Merchant Processing 150 allows payment through unconventional means, thus increasing the available Customers 130 base. Examples of unconventional payments available through Merchant Processing 150 include, but are not limited to, PayPal, Linden Dollars and Google Checkout.

Offsite Backup 160 provides for operational data to be store in a safe means. In some embodiments, Offsite Backup 160 may include a third party. Offsite Backup 160 may include, but is not limited to disk images for each kind of server configuration, source code repositories, customized third-party software on intranet, database contents, email archives and server logs. A server state (web sites, customer services, etc.) may be recovered from Offsite Backup 160. Offsite Backup 160 acts as an insurance against disaster or other NOC 120 disruptions.

In some embodiments, the NOC 120 may access multiple WAN Application Programming Interfaces (APIs), 170a, 170b through 170r, that may be coupled to the WAN 101.

The WAN APIs 170a, 170b to 170r functionalities may then be integrated into the persistent avatars capabilities.

Figure 1B:
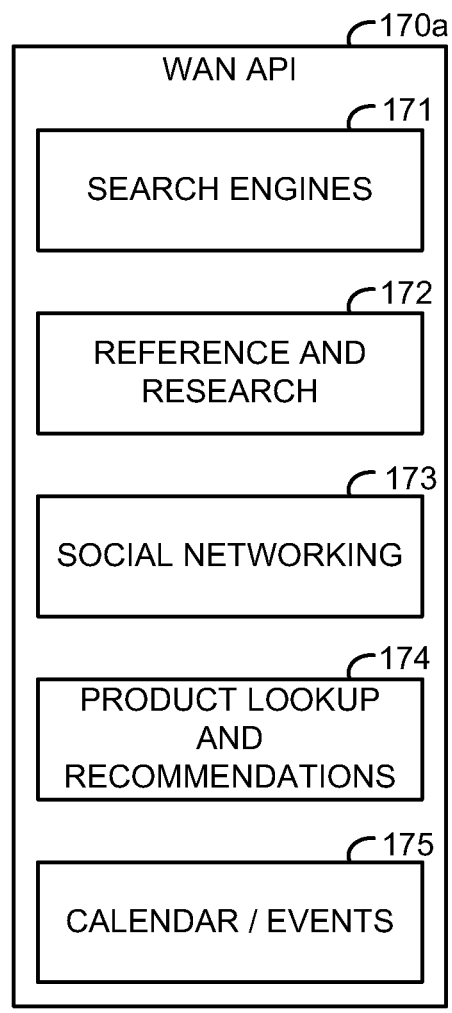
FIG. 1B shows a functional block diagram of wide area network application programming interfaces for the persistent avatar management system of FIG. 1.

FIG. 1B shows a functional block diagram of an exemplary Wide Area Network Application Programming Interface 170a for the persistent avatar management system of FIG. 1. Possible WAN API 170a included within avatar capabilities includes Search Engines 171, References and Research Tools 172, Social Networking Tools 173, Product Lookup and Recommendations 174, and Calendars or Planners 175. The illustrated categories of WAN APIs 170a, 170b to 170r listed is not an exhaustive list, however. Additionally, different WAN APIs 170a, 170b to 170r may be provided to different Customers 130. In some embodiments the Customers 130 may be able to choose the WAN APIs 170a, 170b to 170r integrated into the persistent Avatar's capabilities. Moreover, in some embodiments, the WAN API 170a may only be accessible to the persistent avatar when the avatar is within particular Virtual Environment 211b.

Figure 2A:
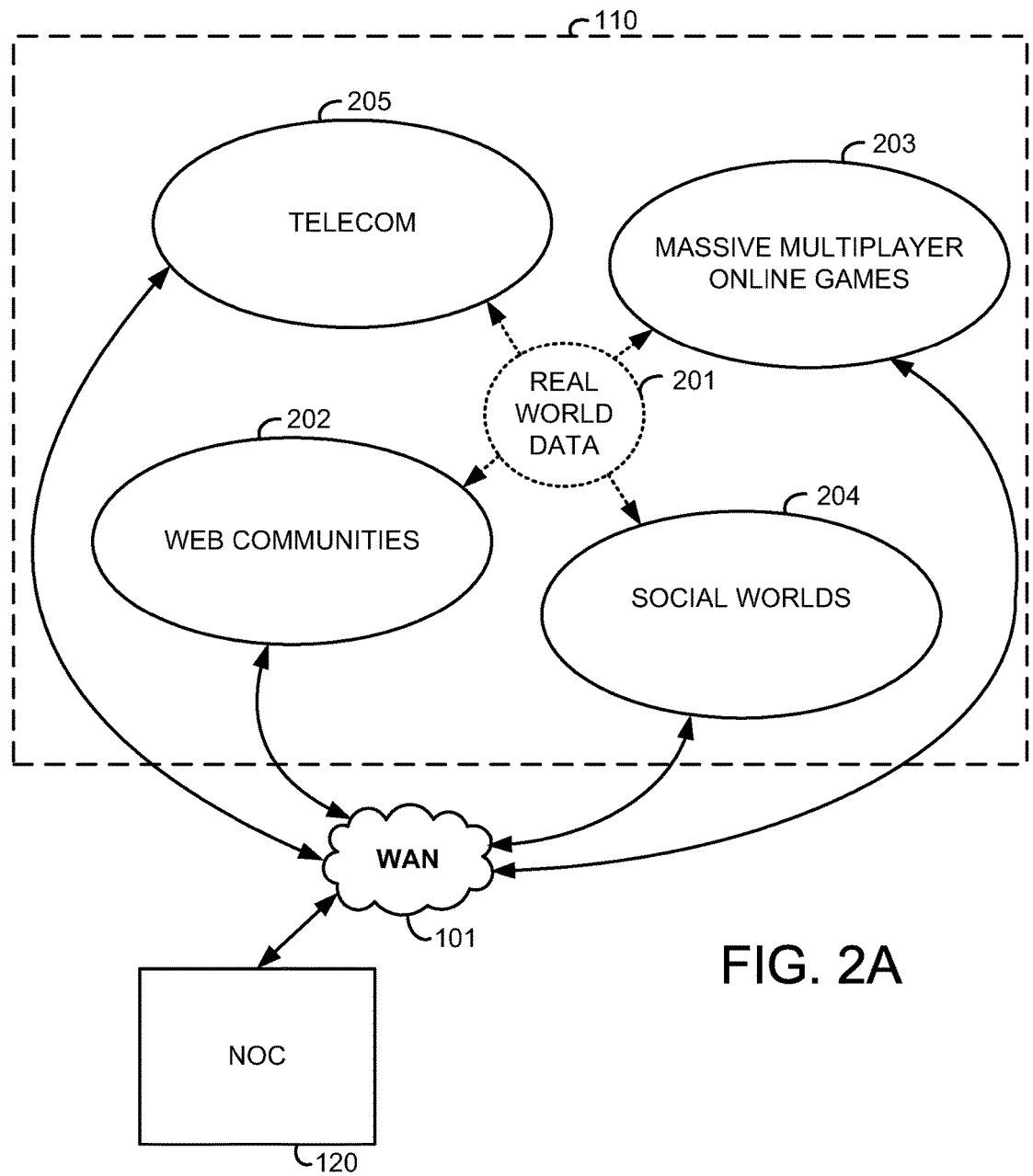
FIG. 2A shows a schematic block diagram of the virtual universe for the persistent avatar management system of FIG. 1.

FIG. 2A shows a schematic block diagram of the Virtual Universe 110 for the persistent avatar management system of FIG. 1. The Virtual Universe 110 may be broken down into five subcategories: Virtual Overlays of Real World Data 201, WEB Communities 202, Massively Multiplayer Online Games (MMOGs) 203, Social Worlds 204, and Telecom 205. Examples of Virtual Overlays of Real World Data 201 include, but are not limited to, Google Earth and Microsoft Flight Simulator X. Examples of WEB Communities 202 include, but are not limited to, YouTube and MySpace. Examples of MMOGs 203 include, but are not limited to, World of Warcraft, Guild Wars and Hive. Examples of Social Worlds 204 include, but are not limited to, Second Life and Neopets. Examples of Telecom 205 include, but are not limited to, cell phones, BlackBerry Devices and Personal Digital Assistants (PDA). Additional subcategories may exist, or may emerge with new technology. It is intended that these additional subcategories be incorporated into the Virtual Universe 110. The NOC 120 is coupled to the subcategories of the Virtual Universe 110 through the WAN 101.

Figure 2B:
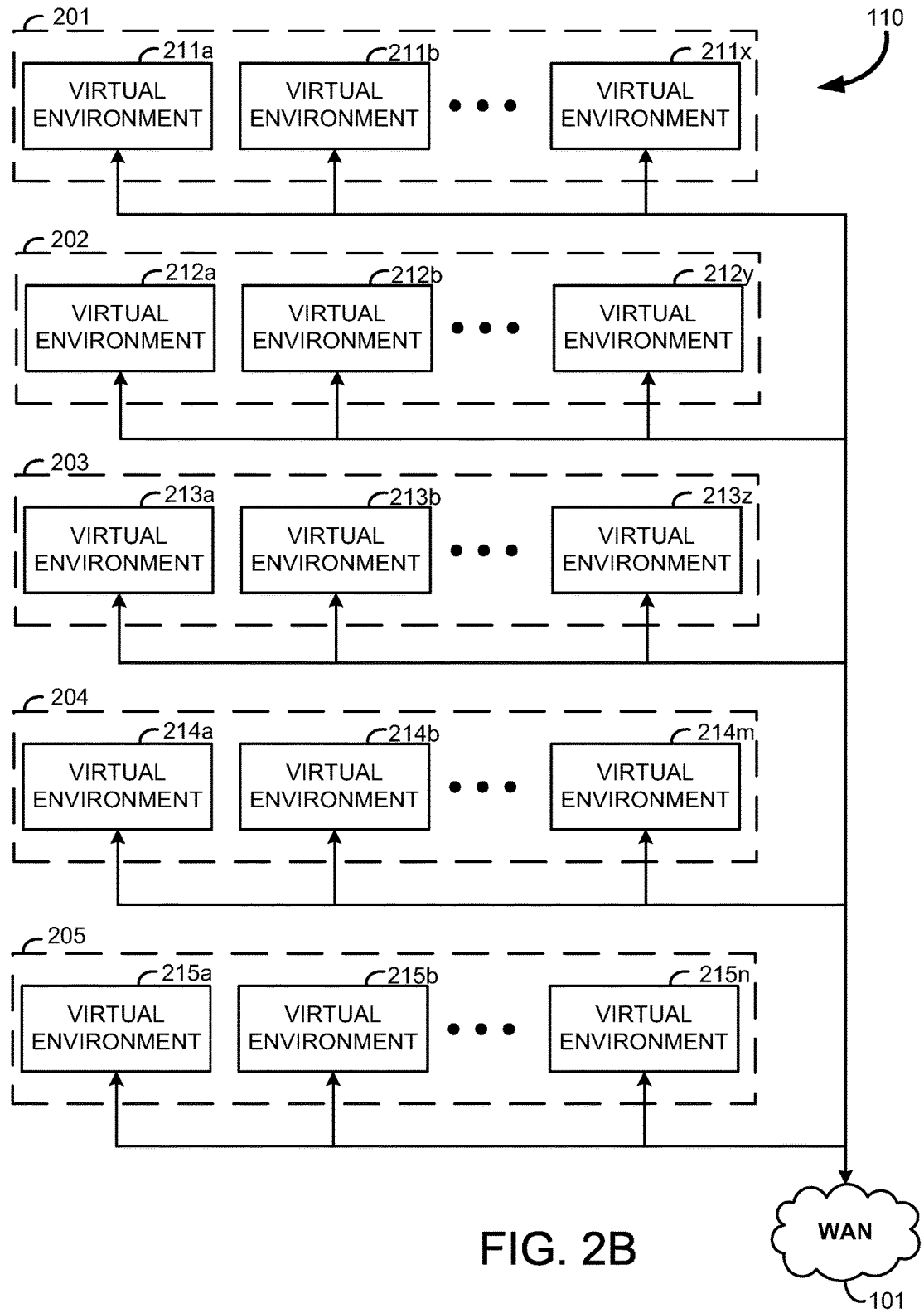
FIG. 2B shows a logical block diagram of virtual environments for the persistent avatar management system of FIG. 1.
Figure 3:
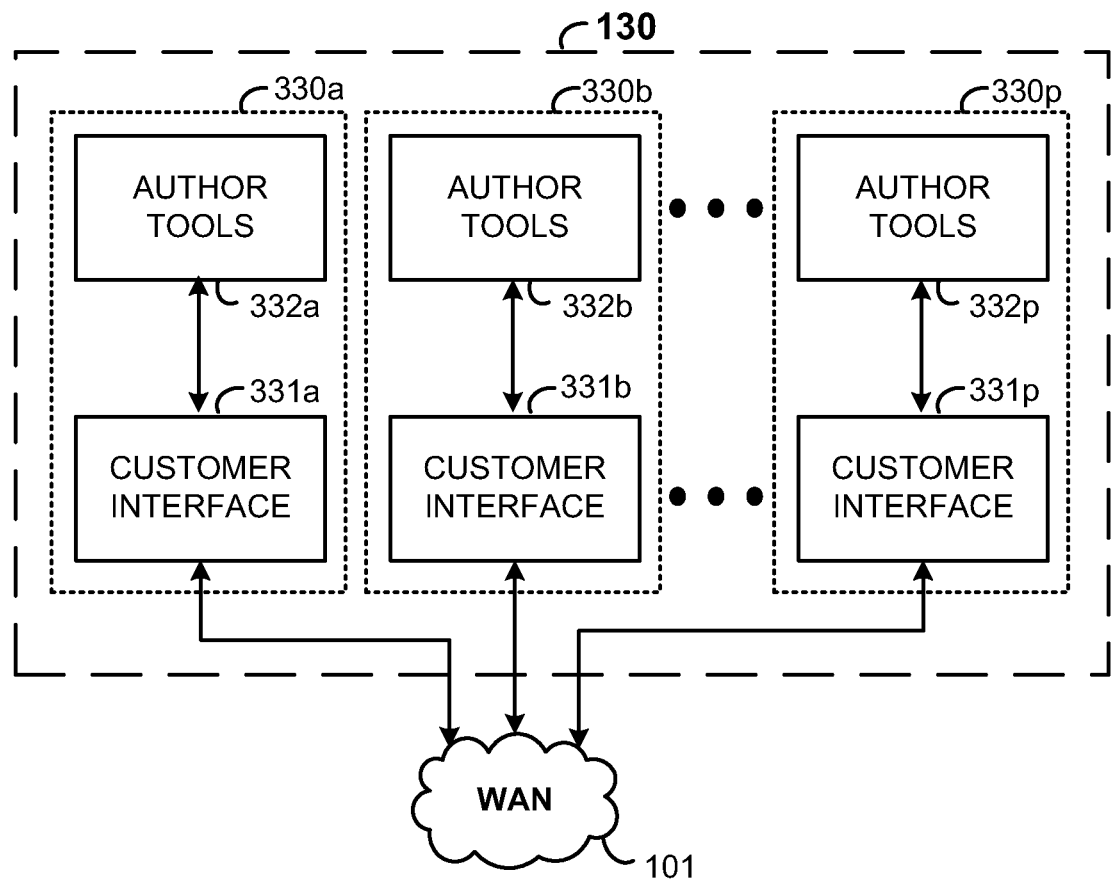
FIG. 3 shows a logical block diagram of end user components for the persistent avatar management system of FIG. 1.

A logical block diagram of the Virtual Universe 110 is shown in FIG. 2B. Each Virtual Environments 211a, 211b to 211x, 212a, 212b to 212y, 213a, 213b to 213z, 214 a, 214b to 214m, 215 a, 215b to 215n is coupled to the WAN 101. Each subcategory, Virtual Overlays of Real World Data 201, WEB Communities 202, MMOGs 203, and Social Worlds 204, and Telecom 205, may include multiple Virtual Environments 211a to 215n. Moreover, some Virtual Environments 211a to 215n may be hybrids of these subcategories. Thus, while the line between specific subcategories may become increasingly indistinct, the boundaries between individual Virtual Environments 211a to 215n are distinct and nearly impassable. Occasionally, the Virtual Overlays of Real World Data 201 have provided some connectivity between Virtual Environments 211a to 215n as shown in FIG. 3; however this connectivity is limited in scope. The NOC 120, on the other hand, is able to access all the Virtual Environments 211a to 215n thereby providing a bridging mechanism to allow for persistent avatars to migrate from any Virtual Environment 211b to another Virtual Environment 211b.

Figure 2C:
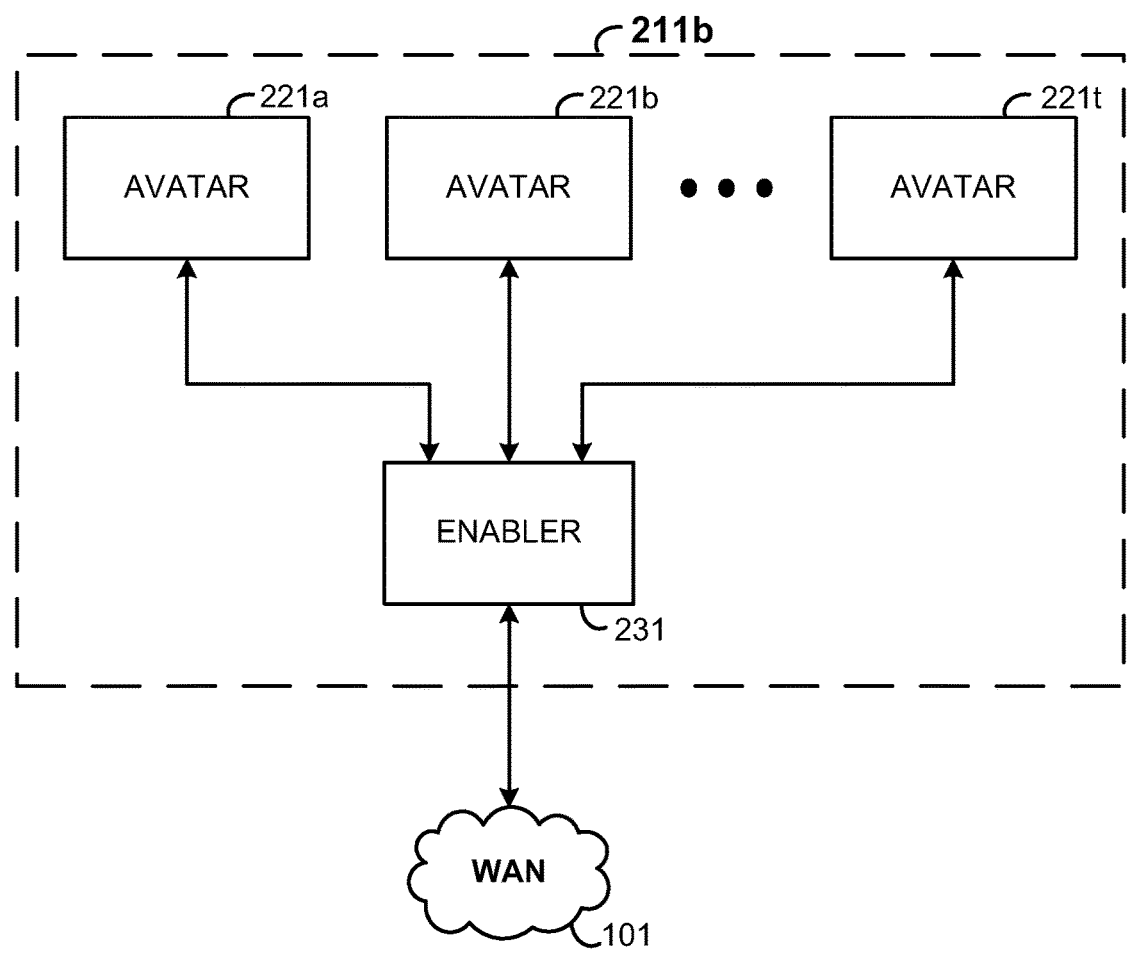
FIG. 2C shows a schematic block diagram of a virtual environment for the persistent avatar management system of FIG. 1.

A logical block diagram of an exemplary Virtual Environment 211b is shown in FIG. 2C. Within each Virtual Environment 211b exists an Enabler 231. The Enabler 231 allows for Persistent Avatar 221a, 221b to 221t to access the WAN 101, and eventually the NOC 120. In some embodiments, each Virtual Environment 211b has a corresponding Enabler 231. However, any number of Persistent Avatars 221a to 221t may exist within a Virtual Environment 211b at any given time. Additionally, due to the migratory nature of the Persistent Avatars 221a to 221t, the number of Avatars 221a to 221t within the Virtual Environments 211b is in flux.

Figure 2D:
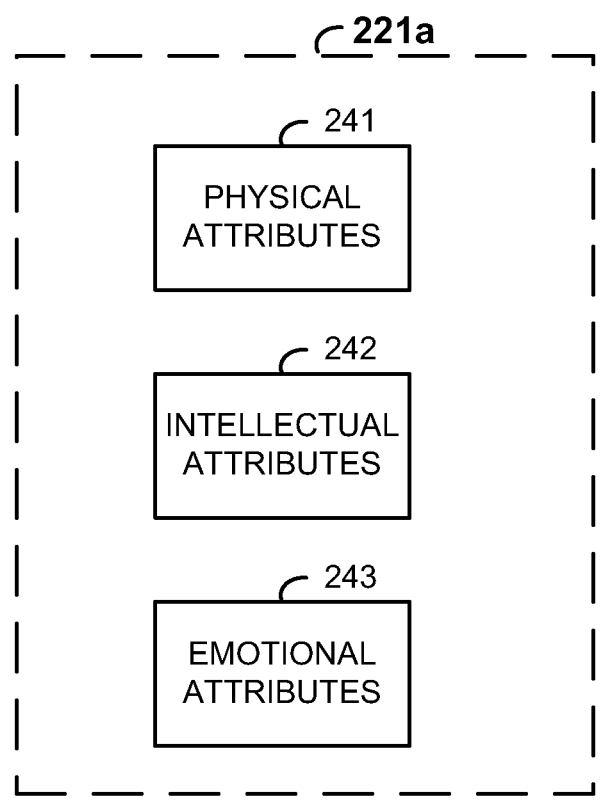
FIG. 2D shows a schematic block diagram of an avatar for the persistent avatar management system of FIG. 1.

An logical block diagram of an exemplary Persistent Avatar 221a is shown in FIG. 2D. In some embodiments, Persistent Avatar 221a may include Physical Attributes 241, Intellectual Attributes 242 and Emotional Attributes 243. Physical Attributes 241 may include Avatar's 221a physical statistics, such as strength, and appearance data. Intellectual Attributes 242 may include the Avatar's 221a backstory, history and memory. Emotional Attributes 243 may include the Avatar's 221a emotional disposition, and reaction and response algorithms.

FIG. 3 shows a logical block diagram of End User Components 330a, 330b to 330p for the persistent avatar management system of FIG. 1. Each customer of the Customers 130 includes an End User Component 330. In some embodiments, the End User Components 330a, 330b to 330p includes Author Tools 332a, 332b to 332p, respectively, that are coupled to the WAN 101 through Customer Interface 331a, 331b to 331p, respectively. The Author Tools 332a to 332p provides user management of the Persistent Avatar 221a. In some embodiments, each Customer 130 may own or use multiple Persistent Avatars 221a to 221t.

Figure 4A:
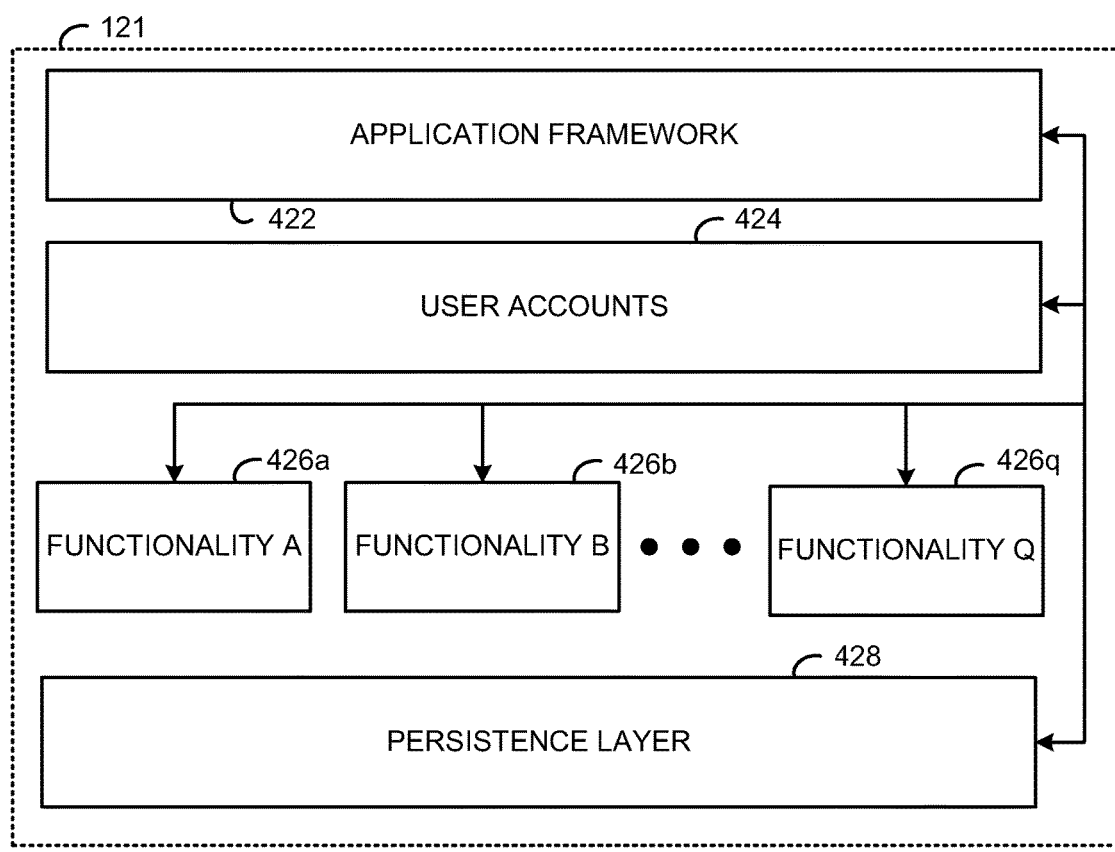
FIG. 4A shows a functional block diagram of the server architecture for the persistent avatar management system of FIG. 1.

FIG. 4A shows a functional block diagram of the server architecture for the persistent avatar management system of FIG. 1. In some embodiments, Server 121 includes an Application Framework 422, User Accounts 424, multiple Functionality Modules 426a, 426b to 426q and a Persistence Layer 428. The Application Framework 422 integrates and unifies Service Oriented Architecture (SOA) technologies. User Accounts 424 provides back access to the Customer Interfaces 330. The Persistence Layer 428 provides object/relational persistence and query service. The Functionality Modules 426a to 426q provide additional functional components for NOC 120 driven Persistent Avatars 221a to 221t.

Figure 4B:
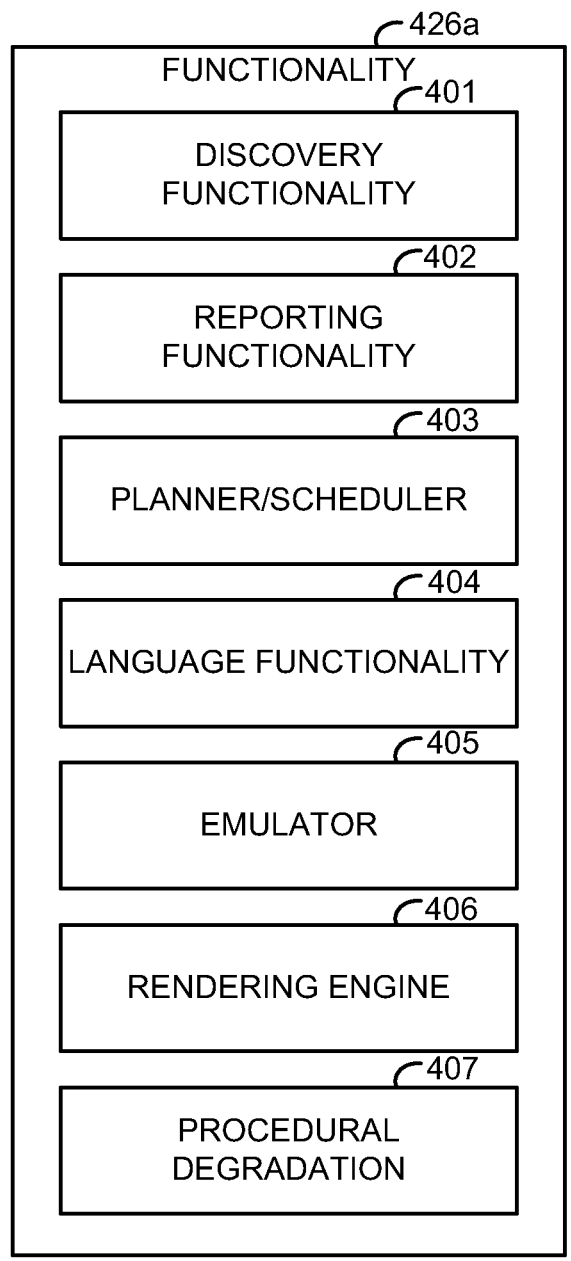
FIG. 4B shows a functional block diagram of the functionality modules for the persistent avatar management system of FIG. 1.

FIG. 4B shows a functional block diagram of exemplary Functionality Modules 426a for the persistent avatar management system of FIG. 1. In some embodiments, Functionality Modules 426a include a Discovery Functionality 401, a Reporting Functionality 402, a Planner and Scheduler 403, a Language Functionality 404, Emulators 405, a Rendering Engine 406, and a Procedural Degradation 407. The illustrated Functionality Modules 426a is not an exhaustive list, however, and additional Functionality Modules 426a to 426q may be incorporated as need dictates. The Discovery Functionality 401 provides text data mining, simulations and evolving algorithms. The Reporting Functionality 402 may include reporting usage, revenues, security attacks and similar statistically significant data. The Planner and Scheduler 403 may determine a sequence of actions, wherein the actions are related activities, and then coordinates the timing for the actions. In some embodiments these functions may be externalized when Avatar 221a serves as a "personal assistant". For example, Avatar 221a takes some responsibilities for planning the owner's schedule, such as for calls and appointments. The Language Functionality 404 includes grammatical parsing, statistical parsing and subsequent emotional assessment of text dialog. The Emulators 405 provide the ability to emulate corresponding Virtual Environments 211a to 215n. In some embodiments, the Emulators 405 may simulate the area most local to the Avatar 221a and base decisions on the approximations generated by the simulation. The Rendering Engine 406 provides the ability to render Persistent Avatars' 221a to 221t appearance. The Procedural Degradation 407 matches the level of rendering to the capabilities of the target Virtual Environment 211b. Procedural Degradation 407 may drive the Rendering Engine 406. Each Virtual Environment 211b tends to have its own unique set of features and limitations. For example, a model used to generate the "physical embodiments" of an Avatar 221a may render as 3D with facial expression in one Virtual Environment 211b, but may need to be rendered as a 2D image for use as Avatar 221a in another of Virtual Environments 211a to 215n.

Figure 5:
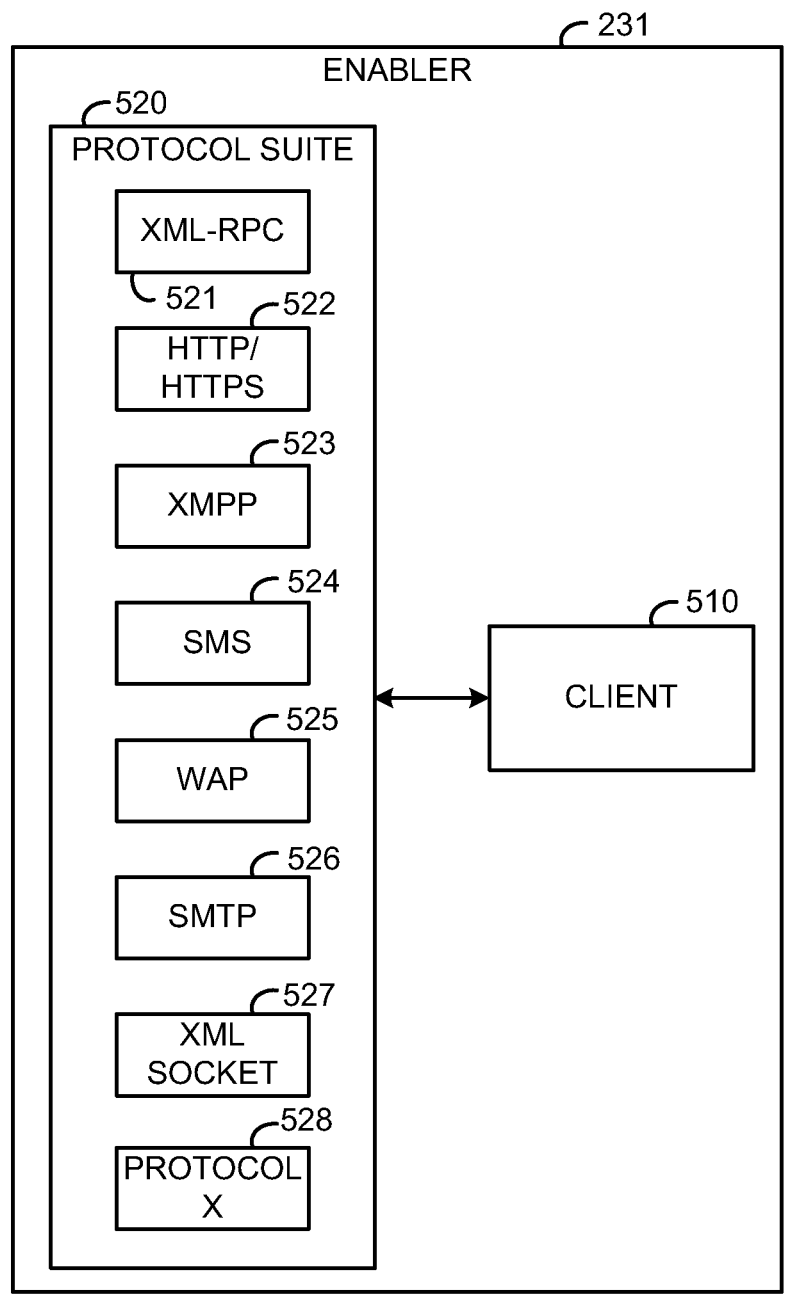
FIG. 5 shows a functional block diagram of an enabler for the persistent avatar management system of FIG. 1.

FIG. 5 shows a functional block diagram of the Enabler 231 for the persistent avatar management system of FIG. 1. The Enabler 231 includes a Client 510 that utilize a Protocol Suite 520. In some embodiments, the Protocol Suit 520 includes protocols such as XML-RPC 521, HTTP/HTTPS 522, XMPP 523, SMS 524, WAP 525, SMTP 526, XML Socket 527, and Protocol X 528. Protocol X 528 may include any additional protocols as they become advantageous to include within the Protocol Suite 520. In some embodiments the Enabler 231 is platform dependent, and uses native language of the Virtual Environments 211a to 215n. Client 510 may be a thin client module. Depending on the implementation, the Client 510 may be a thick client. Enabler 231 may be limited as to avoid the risk of being locked into any particular Virtual Environment 211b. Dependent upon implementation.

The Enabler 231 may exist within the Virtual Environments 211a to 215n as either integrated software, or as independent hardware. In some embodiments, the Enabler 231 may exist within the NOC 120. In alternate embodiments, the Enabler 231 may exist with the Customers 130. In these embodiments the Customers 130 may additionally include the Database 122 and Server 121 thereby circumventing the need for any centralized NOC 120.

Figure 6:
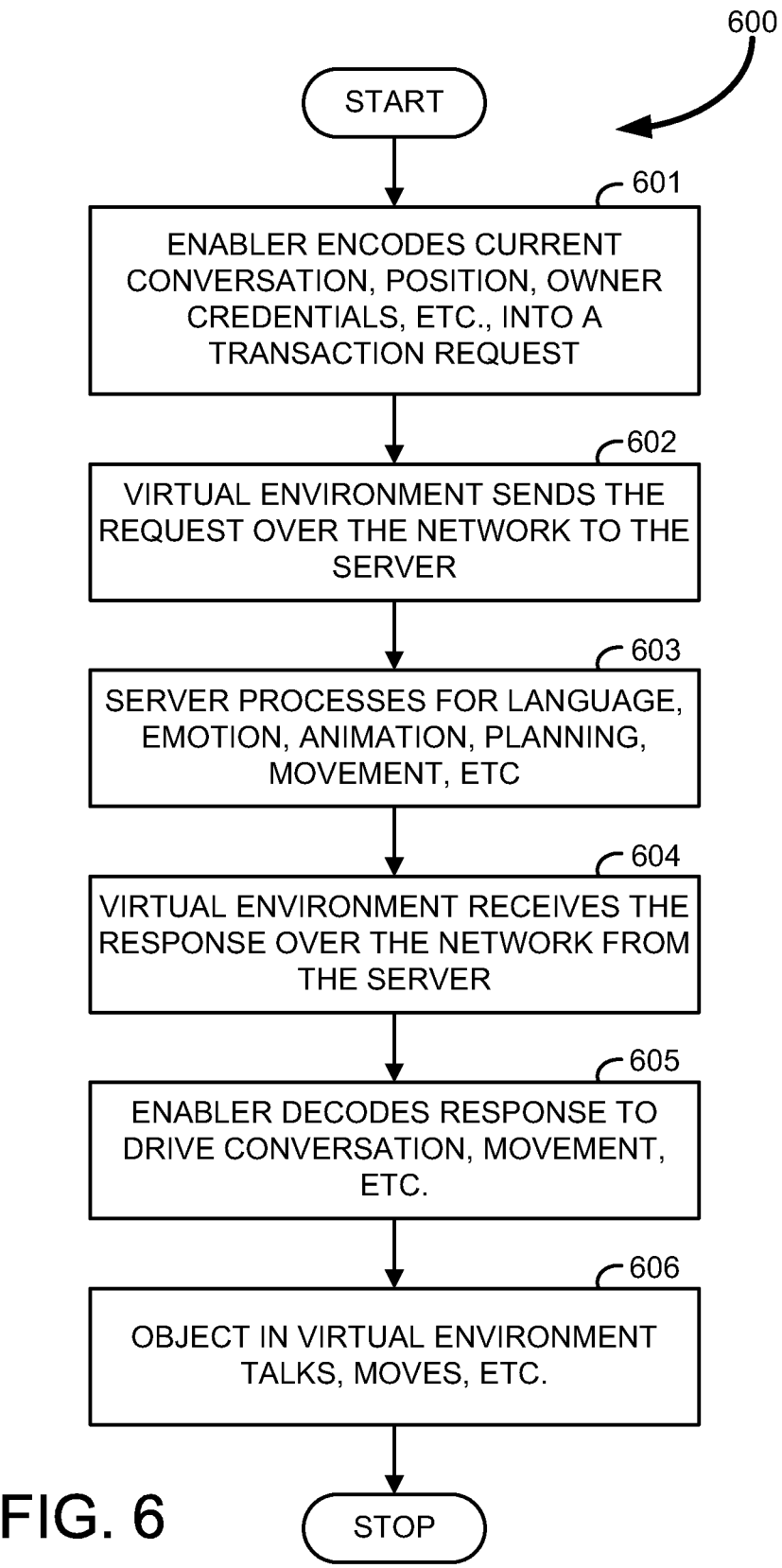
FIG. 6 shows a flow chart illustrating the process for enabling a virtual environment through the enabler for the persistent avatar management system of FIG. 1.

FIG. 6 shows a flow chart illustrating the process 600 for enabling a Virtual Environment 211b through the Enabler 231. In this process the Enabler 231 encodes current conversation, position, owner credentials, attribute data and any other data necessary to drive the Avatars 221a to 221t, into a transaction request for use by the Server 121 at step 601. In some embodiments, the encoding takes place within the Virtual Environment 211b that the Avatar 221a is located.

In step 602 the Virtual Environment 211b sends the transaction request over the WAN 101 to the Server 121.

In step 603 the Server 121 processes the encoded data for language, emotion, animation, planning, and movement and attribute changes. The Server 121 may then make modifications to the avatars 221a attribute data.

In step 604 the Virtual Environment 211b receives the response to the transaction request over the WAN 101 from the Server 121.

In step 605 the Enabler 510 decodes response from the server to drive conversation, movement, actions or animations.

In step 606 the Persistent Avatar 221a in the Virtual Environment 211b talks, moves, acts or gestures.

Figure 7:
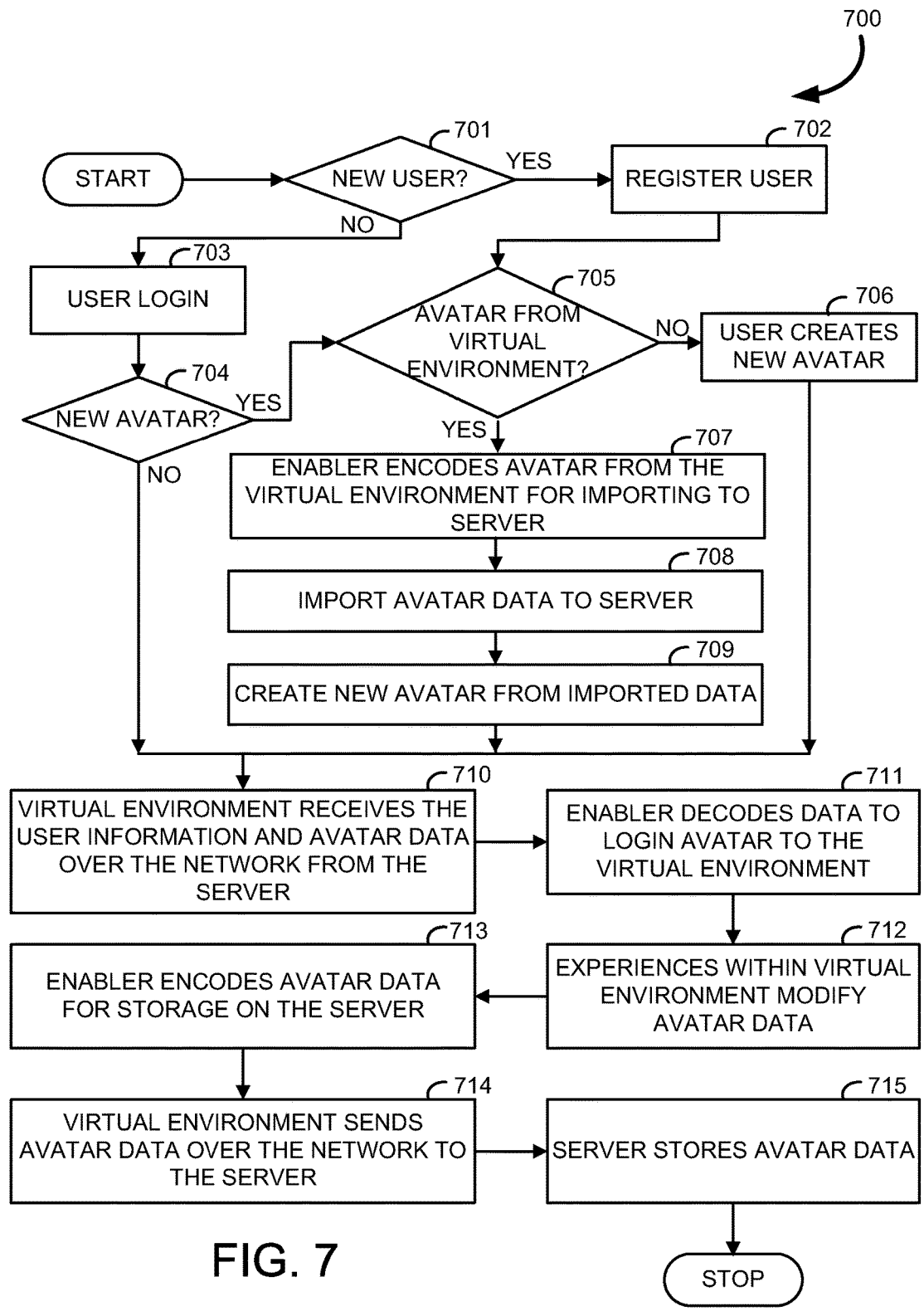
FIG. 7 shows a flow chart illustrating the process for avatar attribute generation for the persistent avatar management system of FIG. 1.

FIG. 7 shows a flow chart illustrating the process 700 for Avatar 221a attribute generation. In some embodiments, attributes may include Physical Attributes 241, Intellectual Attributes 242 and Emotional Attributes 243. In this process a determination is made whether the user is new at step 701. If the user is not new she/he will be required to login at step 703. In some embodiments user credentials may be required to login, typically with a username and password. Of course alternate methods of authenticating user may be utilized as is well known by those skilled in the art. At step 704, a determination is made whether to create a new avatar. If no new avatar is being created the Virtual Environments 211a to 215n receives the user information and data for a preexisting avatar from over the WAN 101 from the Server 121 at step 710. Then proceed to step 711 below.

Otherwise if a new avatar is created then a determination is made whether the Avatar 221a attributes will be from an avatar already in existence in one of the Virtual Environments 211a to 215n, at step 705. If the Avatar 221a is not from a preexisting avatar then the new Avatar 221a will be built from scratch, at step 706. Then, the Virtual Environment 211b receives the user information and data for the newly created Avatar 221a from over the WAN 101 from the Server 121 at step 710. Then proceed to step 711 below.

Else, if the new Avatar 221a is from a preexisting avatar then Enabler 510 encodes the avatar's data from the Virtual Environment 211b for importing to Server 121, at step 707. Then, in step 708, the avatar data is imported to the Server 121. In step 709, the imported avatar data may be used to create the new Avatar 221a. Then, the Virtual Environment 211b receives the user information and data for the newly created Avatar 221a from over the WAN 101 from the Server 121 at step 710. Then proceed to step 711 below.

If in step 701 the user is a new user then the user registers in step 702. Registration may include generating a username and password. Then an Avatar 221a is created. A determination is made whether the new Avatar 221a attributes will be from an avatar already in existence in a Virtual Environment 211b, at step 705. If the new Avatar 221a is not from a preexisting avatar then the new Avatar 221a will be built from scratch, at step 706. Then, the Virtual Environment 211b receives the user information and data for the newly created Avatar 221a from over the WAN 101 from the Server 121 at step 710. Then proceed to step 711 below.

Else, if the new Avatar 221a is from a preexisting avatar then Enabler 510 encodes the avatar data from the Virtual Environment 211b for importing to Server 121, at step 707. Then, in step 708, the avatar data is imported to the Server 121. In step 709, the imported avatar data may be used to create the new Avatar 221a. Then, the Virtual Environment 211b receives the user information and data for the newly created Avatar 221a from over the WAN 101 from the Server 121 at step 710.

At step 711 the Enabler 510 decodes the data and logs the Avatar 221a into the Virtual Environment 211b. The Avatar 221a incurs experiences within the Virtual Environment 211b which may result in changes made to the Avatar 221a. At step 712 the experiences within Virtual Environment 211b modify Avatar 221a data. In step 713 the enabler encodes the Avatar 221a data, including the modifications, for storage on the Server 121. In step 714 the Virtual Environment sends the Avatar 221a to 215n data over the WAN 101 to the Server 121. The Server 121 then stores the Avatar 221a data, thereby incorporating changes made to the Avatar 221a within the Virtual Environment 211b.

Figure 8:
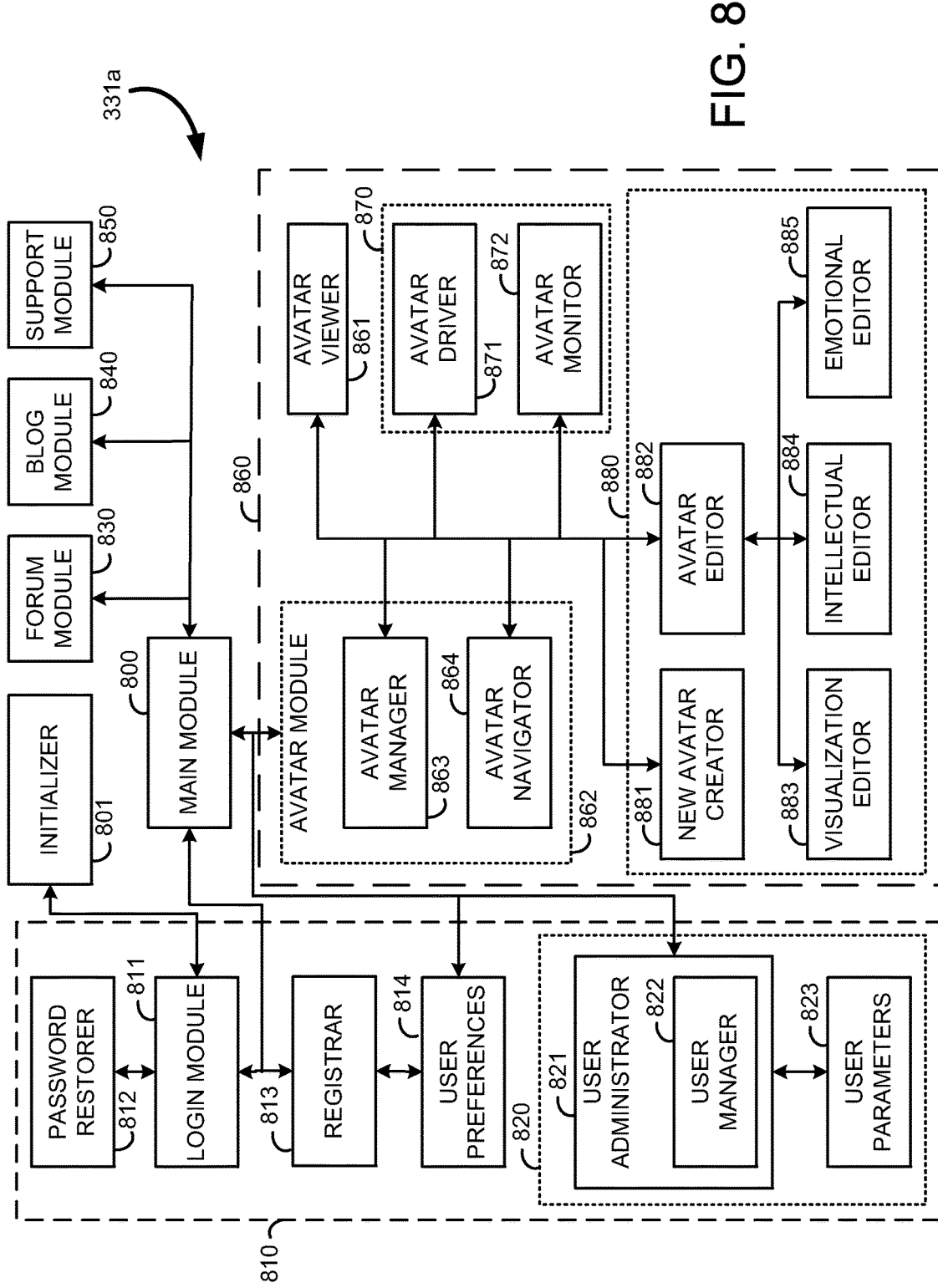
FIG. 8 shows a logical block diagram of a user interface system for the persistent avatar management system of FIG. 1.

FIG. 8 shows a logical block diagram of an exemplary Customer Interface 331a for the persistent avatar management system of FIG. 1. An Initializer 801 is coupled to Login Module 811. Login 811 is included in a User Module 810. User Module 810 includes functionality such as Password Restorer 812, Registrar 813, User Preferences 814, and User Director 820. Login 811 is coupled to the Password Restorer 812 and change Registration 813 information and Main Module 800. Registration 813 is coupled with Main 800 and User Preferences 814. Main Module 800 is coupled to Login 811, Registration 813, User Preferences 814, User Director 820, Forum Module 830, Blog Module 840, Support Module 850 and Avatar Development Module 860 via the Avatar Module 862.

The User Director 820 includes a User Administrator 821 which in turn includes User Manager 822, and User Parameters 823. User Parameters 823 is coupled to the User Administration Main 821. The User Director 820 module allows for management of users and the parameters of each user. For instance a particular one of Customers 130 may have multiple users; however, certain Virtual Environments 211*a* to 215*n* may be accessible to a subset of the users.

The Forum Module 830 may provide access to forums to enhance communication. The Forum Module 830 may include forum search ability, the ability to view forums and archive forum discussions.

The Blog Module 840 provides a web log history of the Avatar's 221*a* actions and conversations. The Blog Module 840 may include searching capabilities, viewing capabilities, and the ability to edit or delete the conversational histories of the Avatar 221*a*.

The Support Module 850 may include the ability to request support, search support inquiries by other users, view resolutions to common problems and troubleshoot.

The Avatar Development Module 860 includes Avatar Module 862, Avatar Viewer 861, Avatar Testing Module 870, and an Avatar Redactor 880. The Avatar Module 862 includes Avatar Manager 863 and Avatar Navigator 864. Avatar Testing Module 870 includes manual Avatar Driver 871 and Avatar Monitor 872. The Avatar Redactor 880 includes an Avatar Creator 881, an Avatar Editor 882, Visualization Editor 883, Intellectual Editor 884 and an Emotional Editor 885. The Avatar Redactor 880 includes the ability to create, edit, copy, review and manage one or more Persistent Avatars 221*a* to 221*t*.

The Avatar Module 862 couples with Avatar Viewer 861, manual Avatar Driver 871, Avatar Monitor 872, Avatar Creator 881, and the Avatar Redactor 880 via the Avatar Creator 881 and Avatar Editor 882. The Avatar Editor 882 couples with the Visualization Editor 883, Intellectual Editor 884 and Emotional Editor 885. The layout and structure of the Customer Interface 331*a* is of course not limited by the embodiments aforementioned. Alternate interface designs may be utilized as desired.

Figure 9:
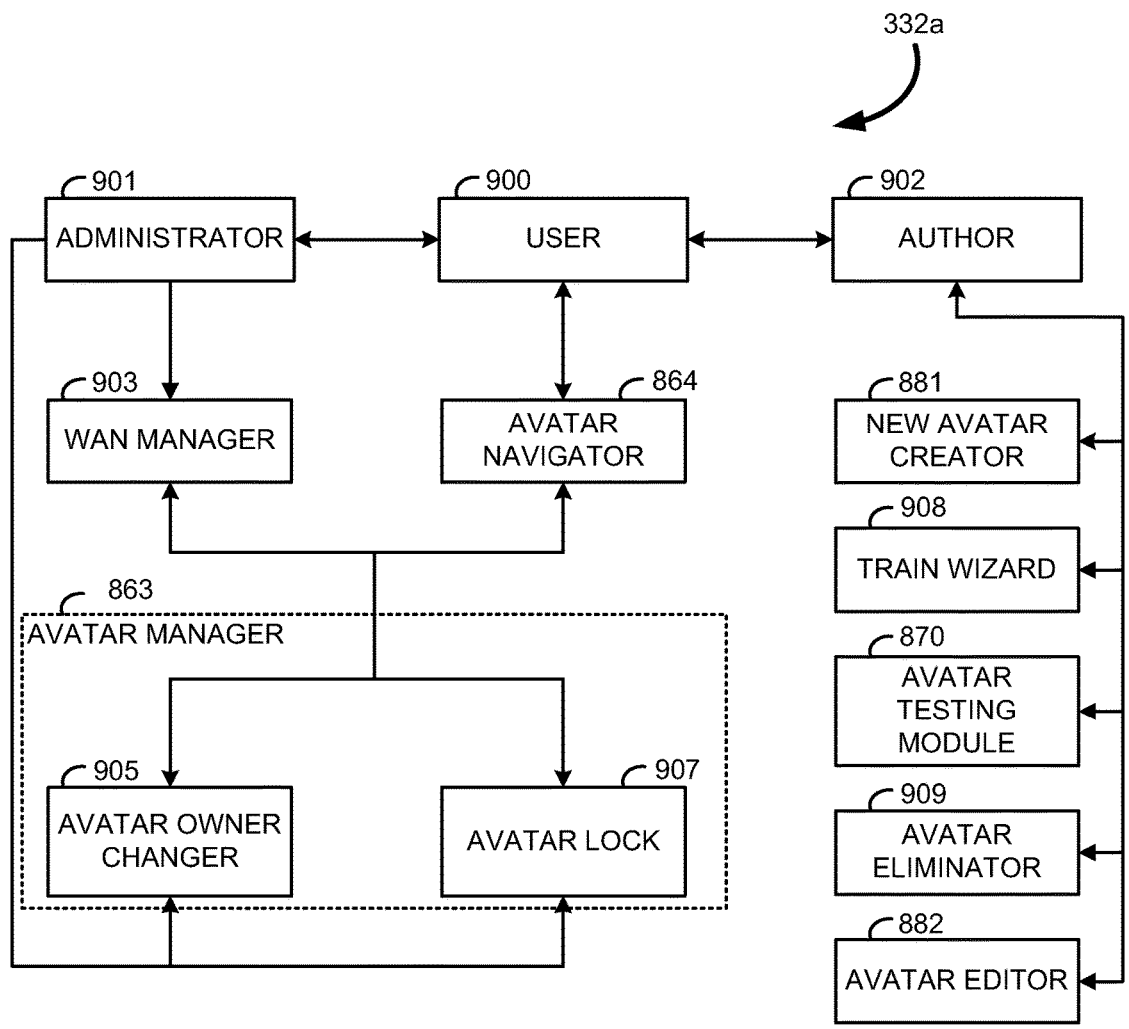
FIG. 9 shows a logical block diagram of author tools for the persistent avatar management system of FIG. 1.

FIG. 9 shows a logical block diagram of an exemplary Author Tools 332*a* for the persistent avatar management system of FIG. 1. Three user roles exist: Common Users 900 or simply "User", Administrators 901 and Authors 902. Users 900 are coupled to Avatar Navigator 864. Administrators 901 and Authors 902 may become Users 900. Conversely, under proper conditions a User 900 may become an Administrator 901 or Author 902.

Administrators 901 are power users who may administrate work of main Customer Interface 331*a* functions. For example Administrators 901 may create arbitrator for forums within the Forum Module 830, and approving of registration new users. Administrators 901 are coupled to WAN Manager 903 and Avatar Manager 863. Avatar Manager 863 includes the ability to Change Avatar's Owner 905 and Avatar Lock 907. Avatar Manager 863 has direct effects upon Avatar Navigator 864.

Authors 902 are users who are involved in process of Avatar 221*a* development (narrations writing, Avatar 221*a* knowledgebase filling, drawing, etc.). Author 902 has access to Blog Module 840 as well. In some embodiments, the Author 902 encapsulates two classes: corporate customer and end-user. There may be a difference between the two for the feature sets enabled in the Avatar Redactor 880. For example corporate customer includes game designer at a companies and would include less breadth of feature sets but more depth. An example of end-user includes an individual with a MySpace account who requires more breadth of feature sets but less depth. Authors 902 have access to New Avatar Creator 881, Avatar Eliminator 909, utilize Train Wizard 908, access Avatar Testing Module 870 and Avatar Editor 882. The Train Wizard 908 may be an advanced feature that utilizes a "wizard", wherein the wizard is a guided set of dialog windows with embedded help, to guide the user through an initial experience of creating rules for the Avatar 221*a*. In some embodiments, an example of interaction may then be shown in the same window as the rules editor, thereby allowing convenient training. Such a feature may be valuable to less experienced users.

Figure 10:
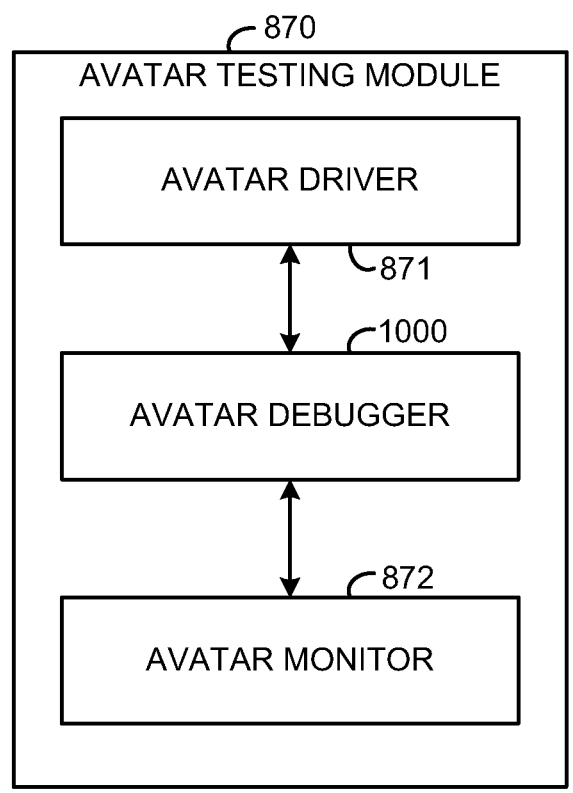
FIG. 10 shows a functional block diagram of an avatar testing module for the persistent avatar management system of FIG. 1.

FIG. 10 shows a functional block diagram of one embodiment of Avatar Testing Module 870 for the persistent avatar management system of FIG. 1. The Avatar Testing Module 870 may include a manual Avatar Driver 871, Avatar Monitor 872, and Avatar Debugger 1000. Avatar Debugger 1000 utilizes information from manual Avatar Driver 871 and Avatar Monitor 872 to debug an Avatar 221*a*. In some embodiments, debugging an Avatar 221*a* may include monitoring Avatar's 221*a* reactions, movements, interactions, gestures and expressions for believability. In alternate embodiments, believability may not be the desired end result, in which case the Avatar 221*a* may be monitored for some alternate behavioral, movement and reactionary criteria. Minor alterations to the Avatar's 221*a* attributes may then be implemented to ensure greater compliance to the desired behavioral, movement and reactionary criteria.

Figure 11:
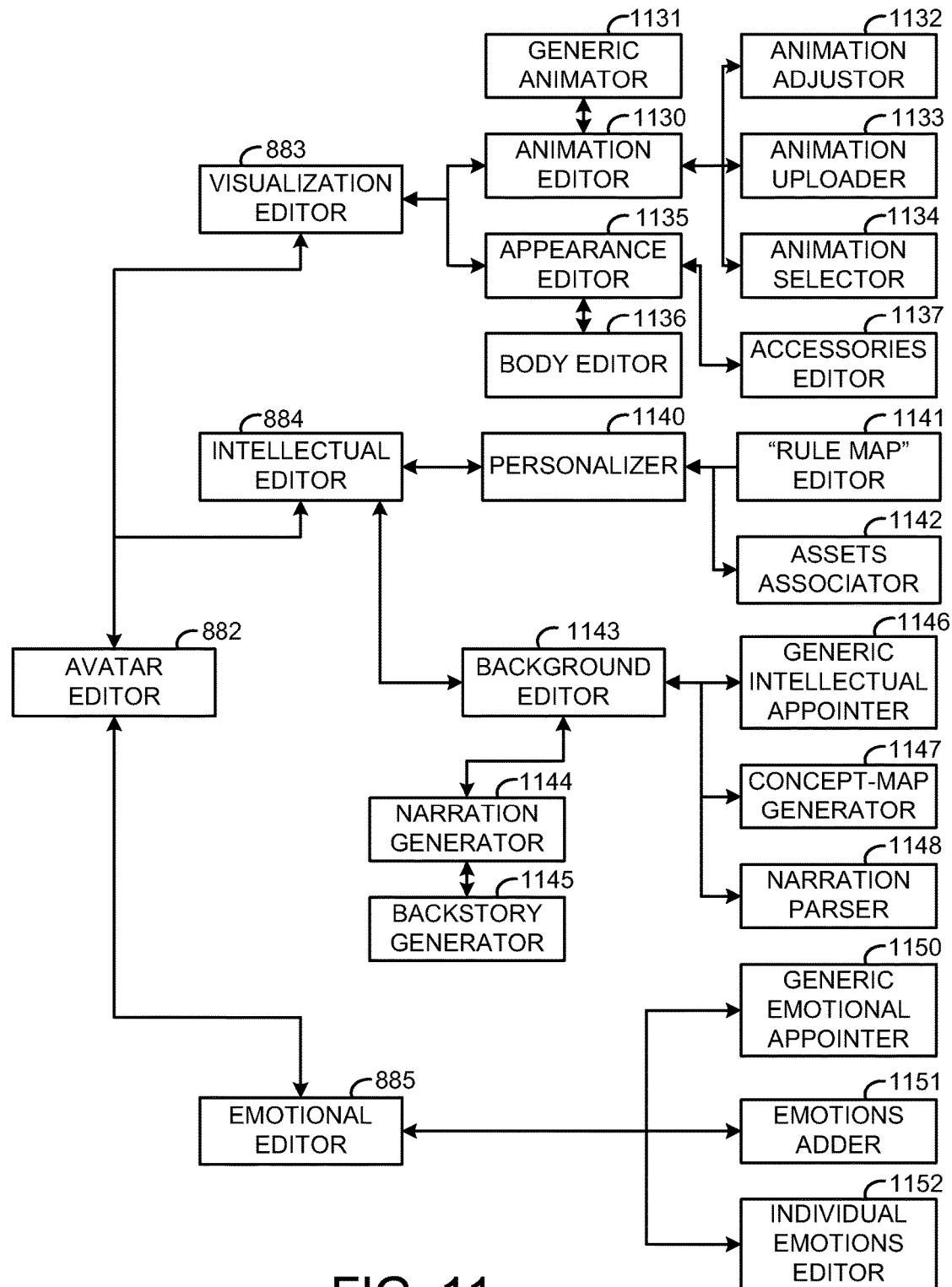
FIG. 11 shows a functional block diagram of an avatar editor for the persistent avatar management system of FIG. 1.

FIG. 11 shows a functional block diagram of the Avatar Editor 882 included in Avatar Redactor 880. Avatar Editor 882 function may be coupled to Visualization Editor 883, Intellectual Editor 884 and Emotional Editor 885. Visualization Editor 883 may be coupled to Animation Editor 1130 and Appearance Editor 1135. Animation Editor 1130 may be coupled to Generic Animator 1131, Animation Adjustor 1132, Animation Up-loader 1133 and Animation Selector 1134. Appearance Editor 1135 may be coupled to Body Editor 1136 and Accessories Editor 1137.

Intellectual Editor 884 may be coupled to Background Editor 1143 and Personalizer 1140. Background Editor 1143 may be coupled to Narration Generator 1144, Generic Intellectual Background Appointer 1146, Concept-Map Generator 1147 and Narration Parser 1148. In some embodiments a concept-map is a graphical representation of a narrative represented by "concepts". Narration Generator 1144 may be coupled to Backstory Generator 1145. Personalizer 1140 may be coupled to "Rule Map" Editor 1141 and Asset Associator 1142. A Rule Map includes an interactive graphic of the rules, how they are connected, which rules are used more often than the others.

Emotional Editor 885 may be coupled to Generic Emotional State Appointer 1150, Emotions Adder 1151 and Individual Emotions Editor 1152. Additional aspects of the Avatar 221*a* may become editable as Avatar 221*a* complexity increases. It is intended that these additional editing functions become incorporated into the Avatar Editor 882. Additionally, in some embodiments it may be advantageous to have fewer editing functions for simplicity or cost versus benefit reasons.

Figure 12:
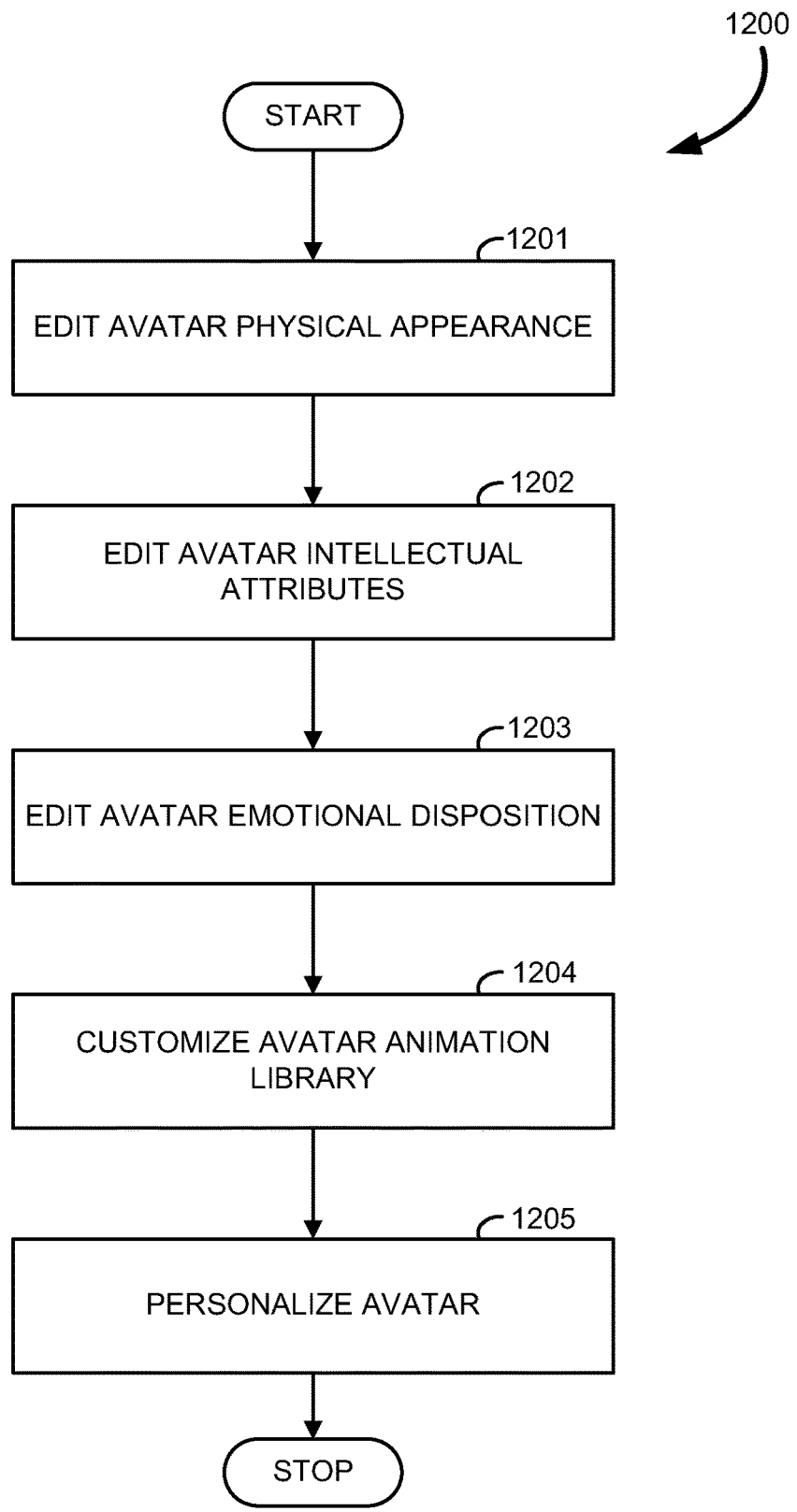
FIG. 12 shows a flow chart illustrating the process for editing an avatar for the persistent avatar management system of FIG. 1.

FIG. 12 shows a flow chart 1200 illustrating the process for editing the Avatar 221*a* for the persistent avatar management system of FIG. 1. In this process, the Avatar's 221*a* appearance is edited at step 1201. Then the Avatar's 221*a* intellectual attributes are edited in step 1202. In step 1203, the Avatar's 221*a* emotional disposition is edited. In step 1204, the Avatar's 221*a* animation library is customized. Lastly, in step 1205, the Avatar 221*a* is personalized.

Figure 13:
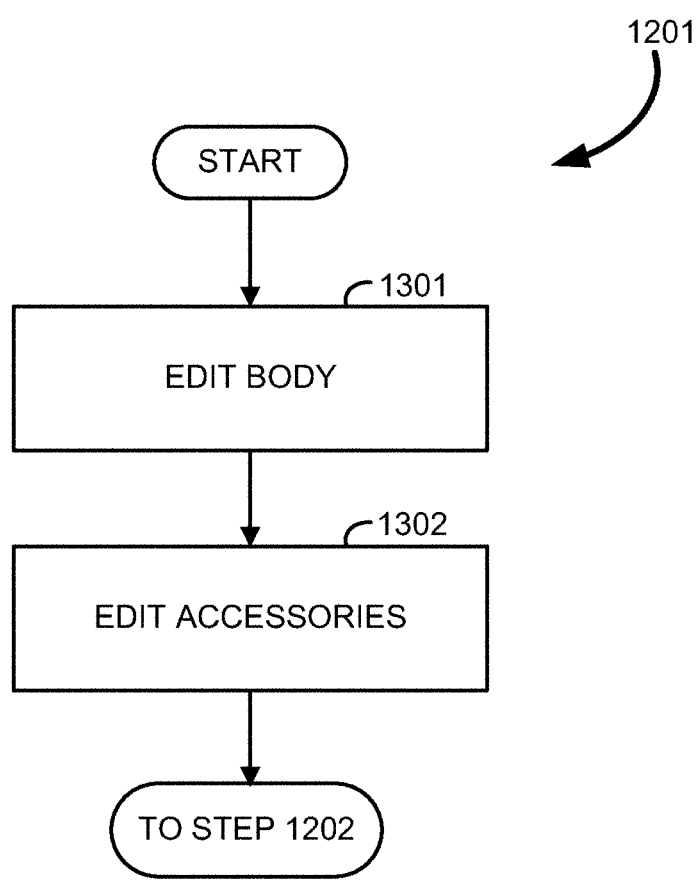
FIG. 13 shows a flow chart illustrating the process for editing the appearance of an avatar for the persistent avatar management system of FIG. 1.

FIG. 13 shows a flow chart 1201 illustrating the process for editing the Avatar's 221a appearance within the Avatar Editor 882. In this process the Avatar's 221a body is edited at step 1301. Then, in step 1302, the accessories are edited. After completion the process returns to step 1202 of FIG. 12.

Three methods of generating multi-dimensional computer graphics can be utilized by system 100. The first method is to manually input data, either by typing on a keyboard or using a Graphical User Interface (GUI) such as a tablet, a joystick and/or a mouse. This can be tedious, but precise, and generally looks esthetically pleasing. The second method is to use 3D scanning technology to enter data which is fast, precise, esthetically pleasing, but is often quite expensive since it requires a 3D scanner. The third method is the use of algorithms which generate models from pre-existing formula, position sets, or other data that dictates the position of the geometry, then doing some variable on that, or even creating it from the ground up. This method, once built, is quite fast, precise, and inexpensive, but may result in distribution of potential errors. Accordingly one, all, or a combination of these methods may be utilized to create dimensional computer graphics for use in the process 1201 of editing the Avatar's 221a appearance.

In some embodiments, template-sets are built that articulate several 'common' anthropomorphic configurations. This template contains all the features of a numerically average human. The proportions of the nose, arms, posture, and other visual features are built to an average for male, female, and neuter models. This is done for mesomorph, ectomorph, and endomorph body types. This provides nine templates from which to work from. The nine base templates may be edited so that any small adjustments are made to ensure a high quality model of nearly-perfect appearance. The model may be custom-tailored to specific desires of facial or body features. The user may engage in an editing process with one of the nine templates which, when completed, creates a model that very closely approximates the user's desired appearance.

In some embodiments, an alternate production path may be desired. Many gamers and developers will have already built models of Avatars 221a to 221t that they enjoy, and it is desirous to allow them to reuse these models as they may already have an Avatar 221a whose attributes are desired. The user may also want to imbue the Avatar 221a with emotion and intellect.

Polygons can also be used for generating multi-dimensional graphical representations. However, while polygons may be subdivided and reduced, the presence of edges generally makes calculation that changes visual resolution complicated, if at all workable. Therefore, in some embodiments, the method of representing geometry may be indefinitely detailed as visual resolution is altered, and still be sufficiently light as to be transportable over a WAN 101. Examples of this kind of 3D representation method include Metaballs, and NURBs (Nonuniform rational B-splines).

Figure 14:
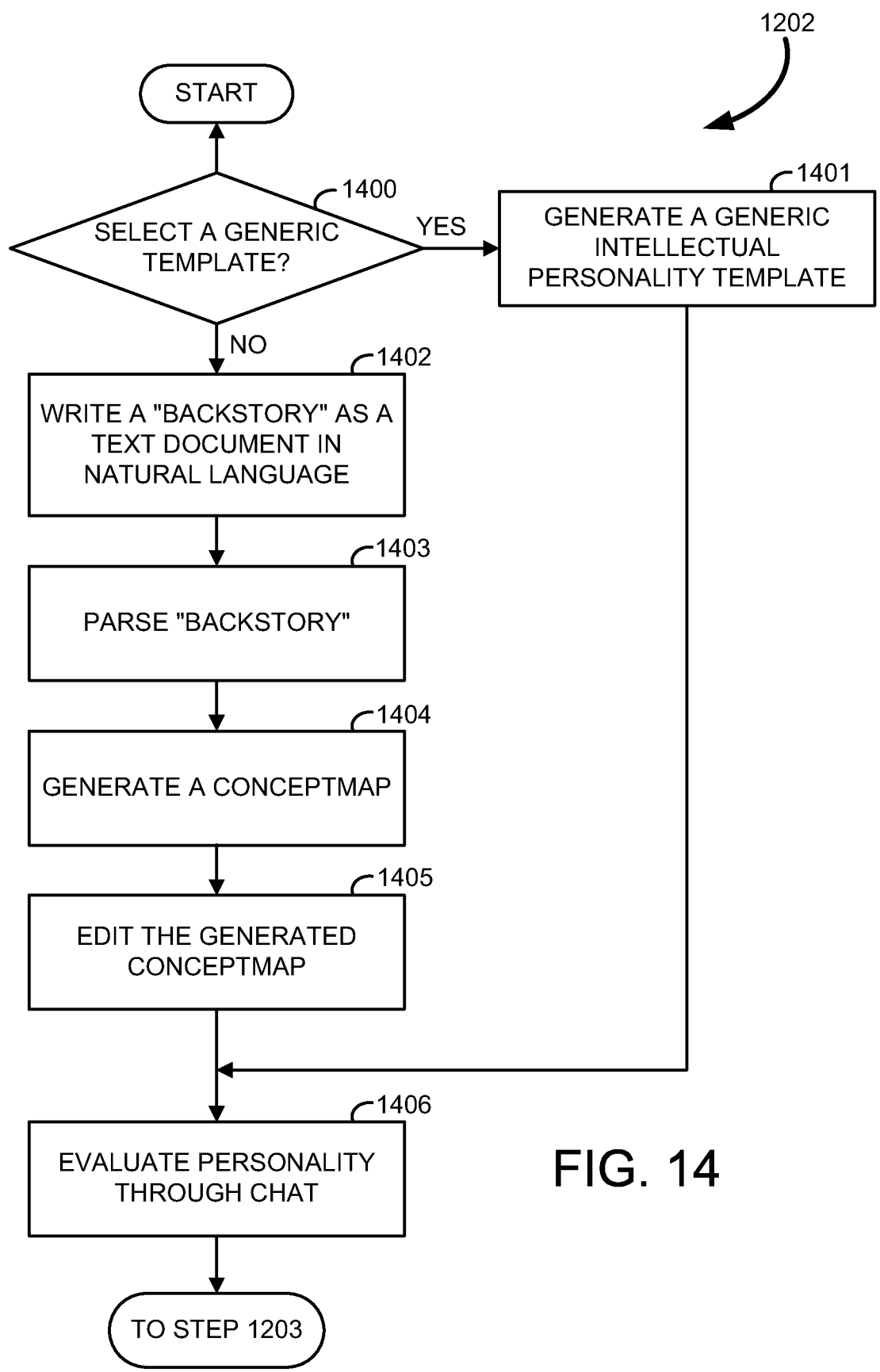
FIG. 14 shows a flow chart illustrating the process for editing the backstory of an avatar for the persistent avatar management system of FIG. 1.

FIG. 14 shows a flow chart 1202 illustrating the process for Editing the Backstory 1145 of an Avatar 221a within the Avatar Editor 882. In this process a determination to use a generic template is made in step 1400. If a generic template will be used, a generic intellectual template is generated in step 1401. The personality is then evaluated through chat in step 1406. After completion the process returns to step 1203 of FIG. 12. Else, if a generic template will not be used, a backstory is written in natural language in step 1402. Then, in step 1403, the backstory is parsed into its conceptual elements. These conceptual elements are then organized in a grid concept-map, in step 1404. In step 1405 the concept-map is edited. The personality is then evaluated through chat in step 1406. After completion the process returns to step 1203 of FIG. 12.

Figure 15:
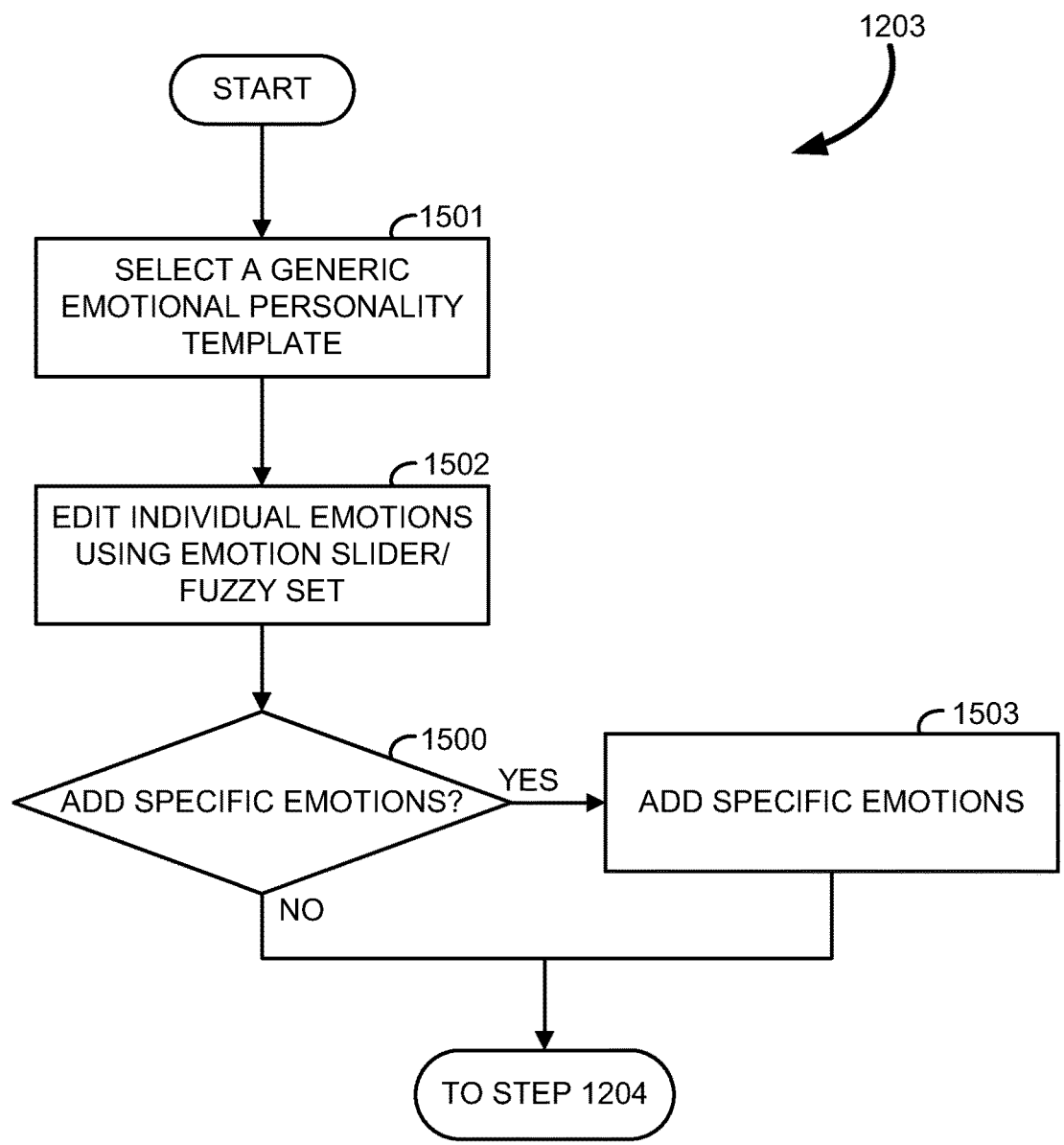
FIG. 15 shows a flow chart illustrating the process for editing the emotional disposition of an avatar for the persistent avatar management system of FIG. 1.

FIG. 15 shows a flow chart 1203 illustrating the process for editing the emotional disposition of an Avatar 221a within the Avatar Editor 882. In this process a general emotional personality template is selected in step 1501. Then, in step 1502, individual emotions are edited with a slider and fuzzy set. In step 1500, a determination is made to add specific emotions. Then, if determined so, specific emotions are added in step 1503. After completion the process returns to step 1204 of FIG. 12. Else if no specific emotions are added the process returns to step 1204 of FIG. 12.

Figure 16:
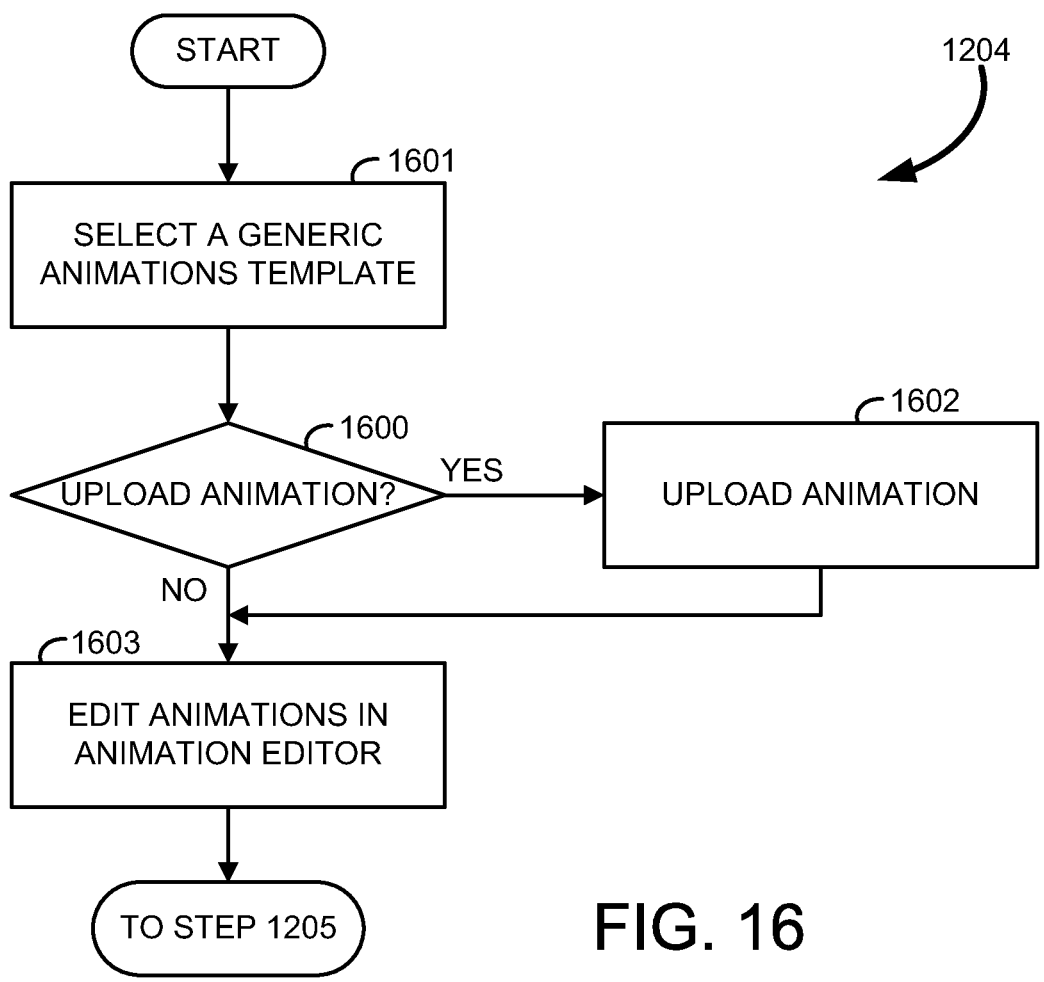
FIG. 16 shows a flow chart illustrating the process for editing the animation of an avatar for the persistent avatar management system of FIG. 1.

FIG. 16 shows a flow chart 1204 illustrating the process for editing the animation of an Avatar 221a within the Avatar Editor 882. In this process a generic animation template is selected in step 1601. In step 1600, a determination is made whether to upload animation. Then, if determined so, animation may be uploaded in step 1602. In step 1603, animations are edited within the animation editor. After completion the process returns to step 1205 of FIG. 12. Else if no animations are uploaded, animations are edited within the animation editor in step 1603. After completion the process returns to step 1205 of FIG. 12.

Figure 17:
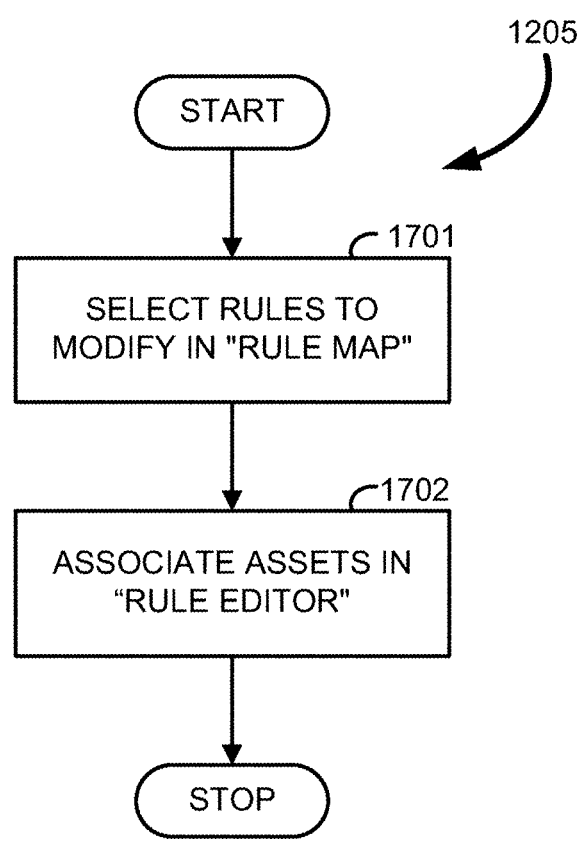
FIG. 17 shows a flow chart illustrating the process for editing the personality rules of an avatar for the persistent avatar management system of FIG. 1.

FIG. 17 shows a flow chart 1205 illustrating the process for editing the personality rules of an Avatar 221a within the Avatar Editor 882. In this process rules within the Rule Map to be modified are selected in step 1701. Then, in step 1702, assets are associated within the rule editor.

Figure 18:
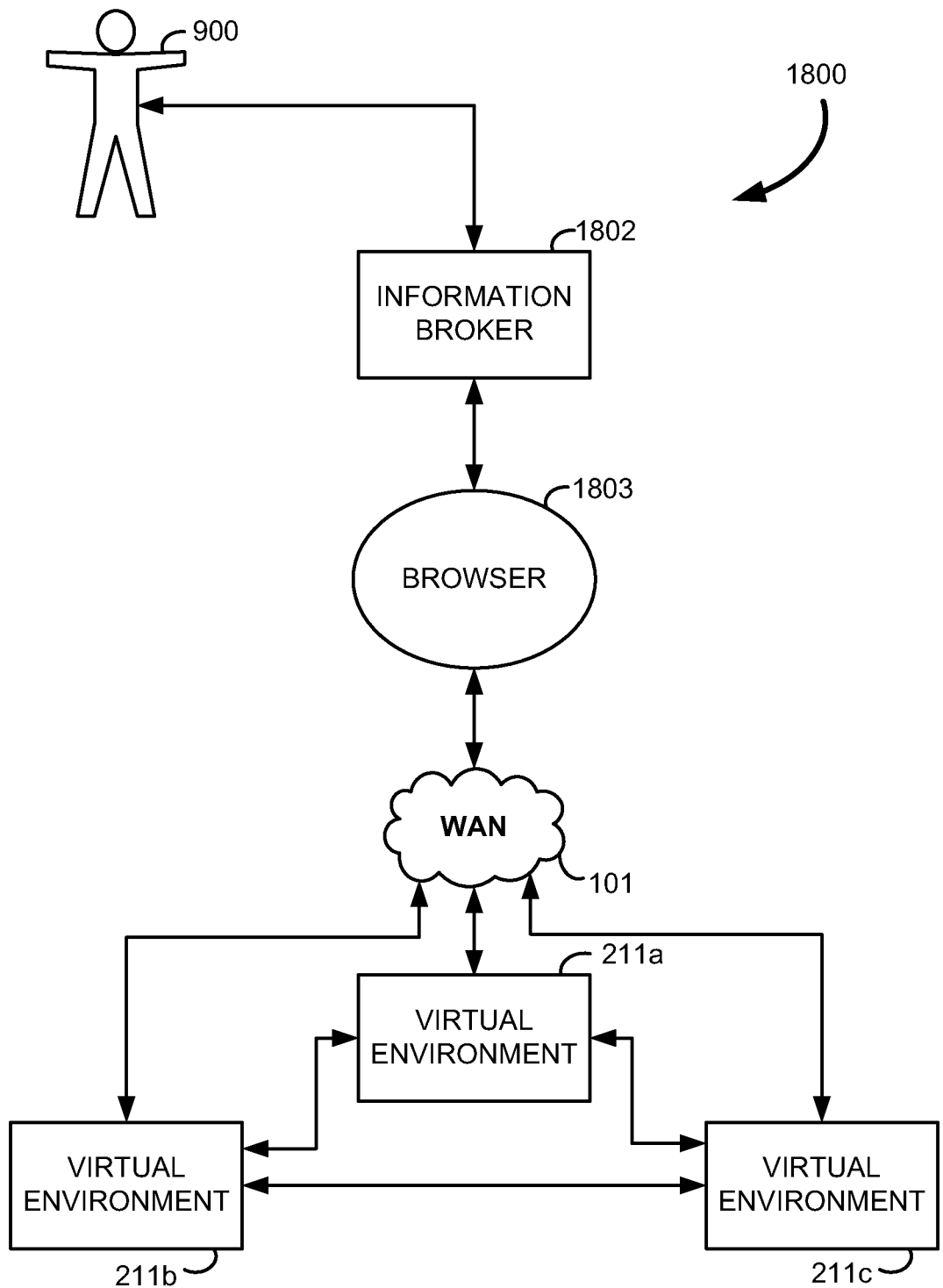
FIG. 18 shows a logical block diagram of user interactions with an information broker in accordance with an embodiment of the present invention.

FIG. 18 shows a logical block diagram 1800 of User 900 interacting with an Information Broker 1802 in accordance with an embodiment of the present invention. In some embodiments, the Information Broker 1802 is a variety of Persistent Avatar 221a that acts as a personal assistant to broker trust and personal information as the User 900 navigates through multiple Virtual Environments 211a to 211c with a separate Persistent Avatar 221a. Multiple Virtual Environments 211a to 211c may include any number of additional Virtual Environments 211a to 215n. Alternatively, in some embodiments the Information Broker 1802 may be a component of the Persistent Avatar 221a that User 900 uses to navigate the Virtual Environments 211a to 214c. In some embodiments the Information Broker 1802 may have no physical representation, and the User 900 may not realize when the Information Broker 1802 is active. Alternatively, the Information Broker 1802 may be a more tangible aspect of the User's 900 virtual exploration.

The User 900 accesses Virtual Environments 211a to 211c through the Information Broker 1802, a browser 1803 and the WAN 101. In some embodiments, some or all of the Virtual Environments 211a to 211c require personal information about the User 900 to provide access or full functionality. Thus, every time the User's 900 Avatar 221a migrates from one Virtual Environment 211a to 211c to another the User 900 is prompted to provide information before the migration may be completed. This repetitive prompting may seriously disrupt User's 900 migration from one Virtual Environment 211a to 211c to another. The Information Broker 1802 makes decisions based upon trust levels for each Virtual Environment 211a to 211c and brokers personal information accordingly in order to make migration more seamless, yet still maintain a high level of security with personal information.

Figure 19:
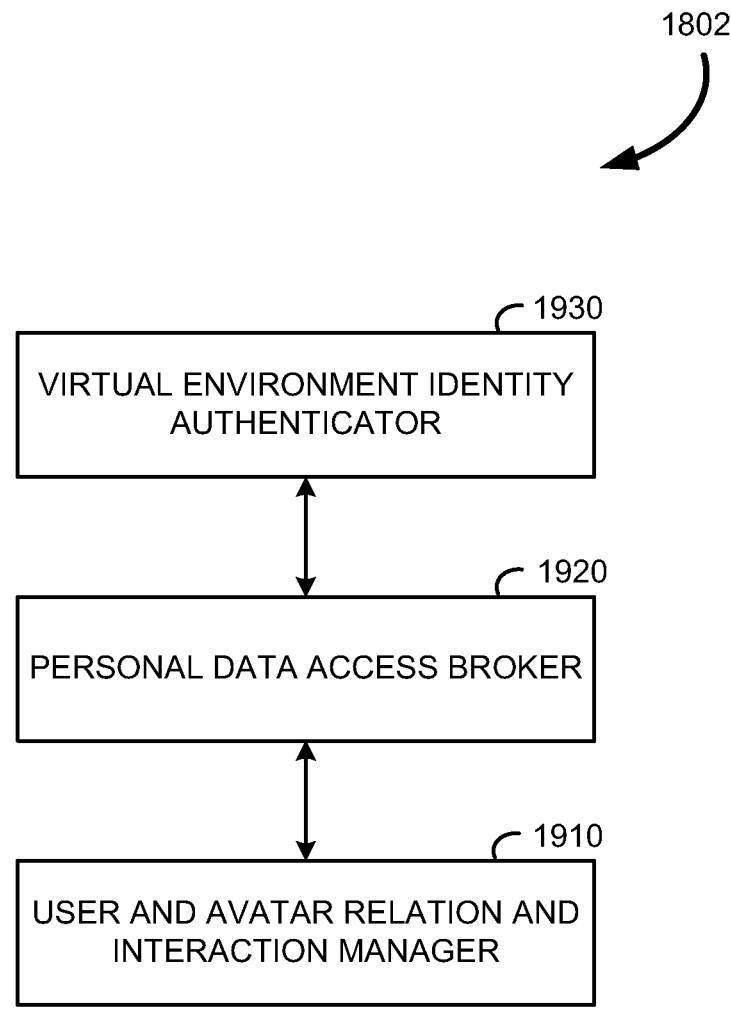
FIG. 19 shows a logical block diagram of the information brokering in accordance with an embodiment of the present invention.

FIG. 19 shows a logical block diagram of the Information Broker 1802 of FIG. 18. Personal Data Access Broker 1920 includes Virtual Environment Identity Authenticator 1930 and User and Avatar Relationship Manager 1910. Virtual Environment Identity Authenticator 1930 is very important since the level of trust provided any particular Virtual Environment 211b is entirely dependent upon that Virtual Environment's 211a to 215n identity. Subsequently, accurate data is imperative to secure Brokering of Access to Personal Information 1920. The User and Avatar Relationship Manager 1910 provides the User's 900 comfort level, preferences, trust and habits. The trustworthiness of a Virtual Environment 211b is then balanced by the User's 900 trust to determine the extent of information access.

Figure 20:
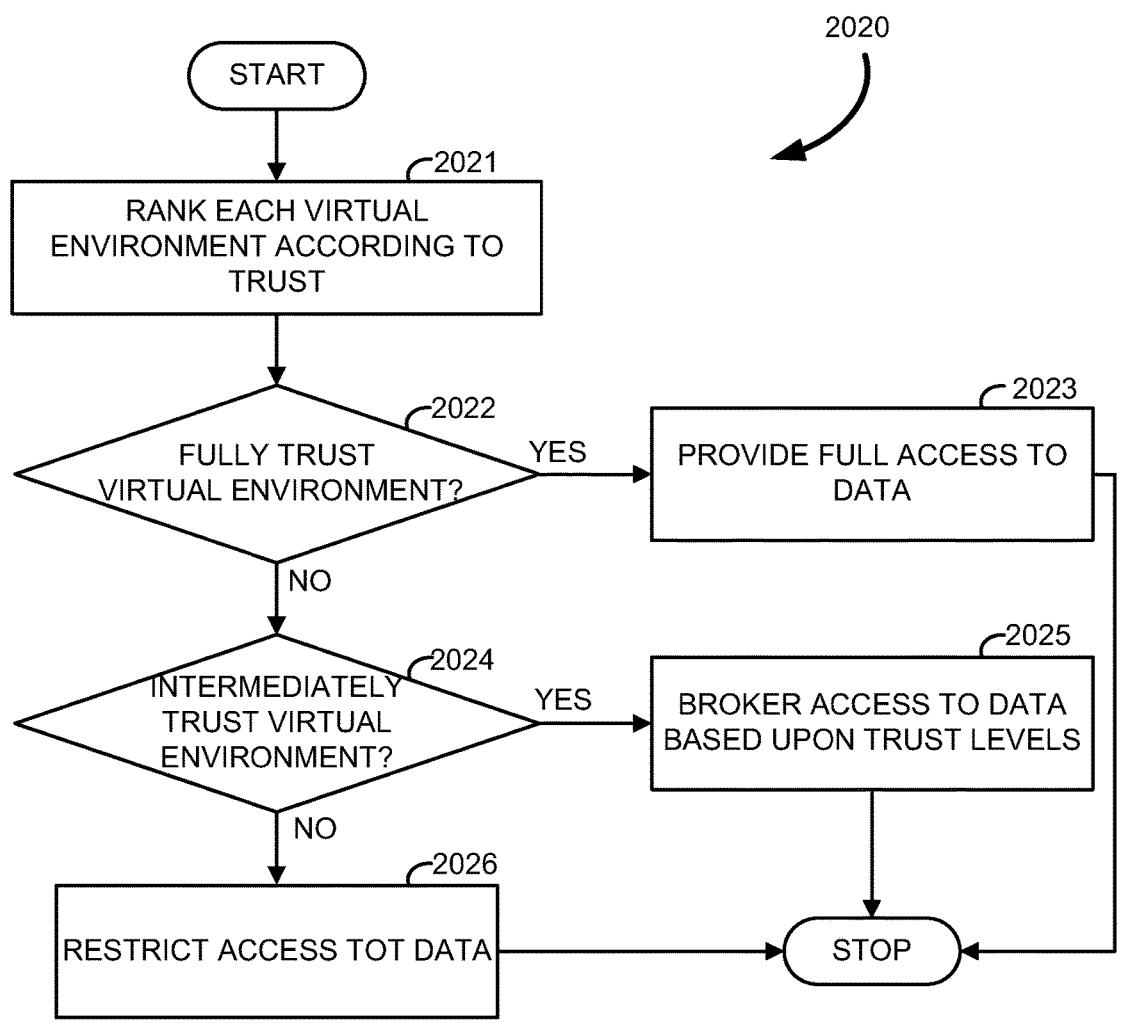
FIG. 20 shows a flow chart illustrating the process for user information brokering for the information broker of FIG. 18.

FIG. 20 shows a flow chart 2020 illustrating the process for Personal Information Access Broker 1920 for the Information Broker 1802 of FIG. 18. In this process the Virtual Environment 211b is ranked by trust in step 2021. In some embodiments, this ranking by trust takes into account the identity of the Virtual Environment 211b, the User's 900 previous trust for the particular Virtual Environment 211b or similar Virtual Environments 211a to 215n, public knowledge of the trustworthiness of the Virtual Environment 211b, and the User's 900 natural trust levels. In some embodiments, additional statistical and preferential information may be utilized in order to determine a trust ranking. In step 2022, a determination is made if the Virtual Environment 211b is fully trusted. If the Virtual Environment 211b is fully trusted the Information Broker 1802 provides full access to the User's 900 available personal information in step 2023.

Else if the Virtual Environment 211b is not fully trusted, a determination is made if the Virtual Environment 211b is intermediately trusted in step 2024. If the Virtual Environment 211b is intermediately trusted, the Information Broker 1802 may provide a limited access to personal information in step 2025. Limited access may be regulated by comparing the level of trust in the Virtual Environment 211b, as determined in step 2021, compared to the sensitivity of the personal information. Alternatively, the User's 900 preferences may augment, or supplant, the sensitivity of the personal information for purposes of regulating limited access to personal information.

Else, if the Virtual Environment 211b is not intermediately trusted, the Information Broker 1802 may restrict access to personal information in step 2026.

Figure 21:
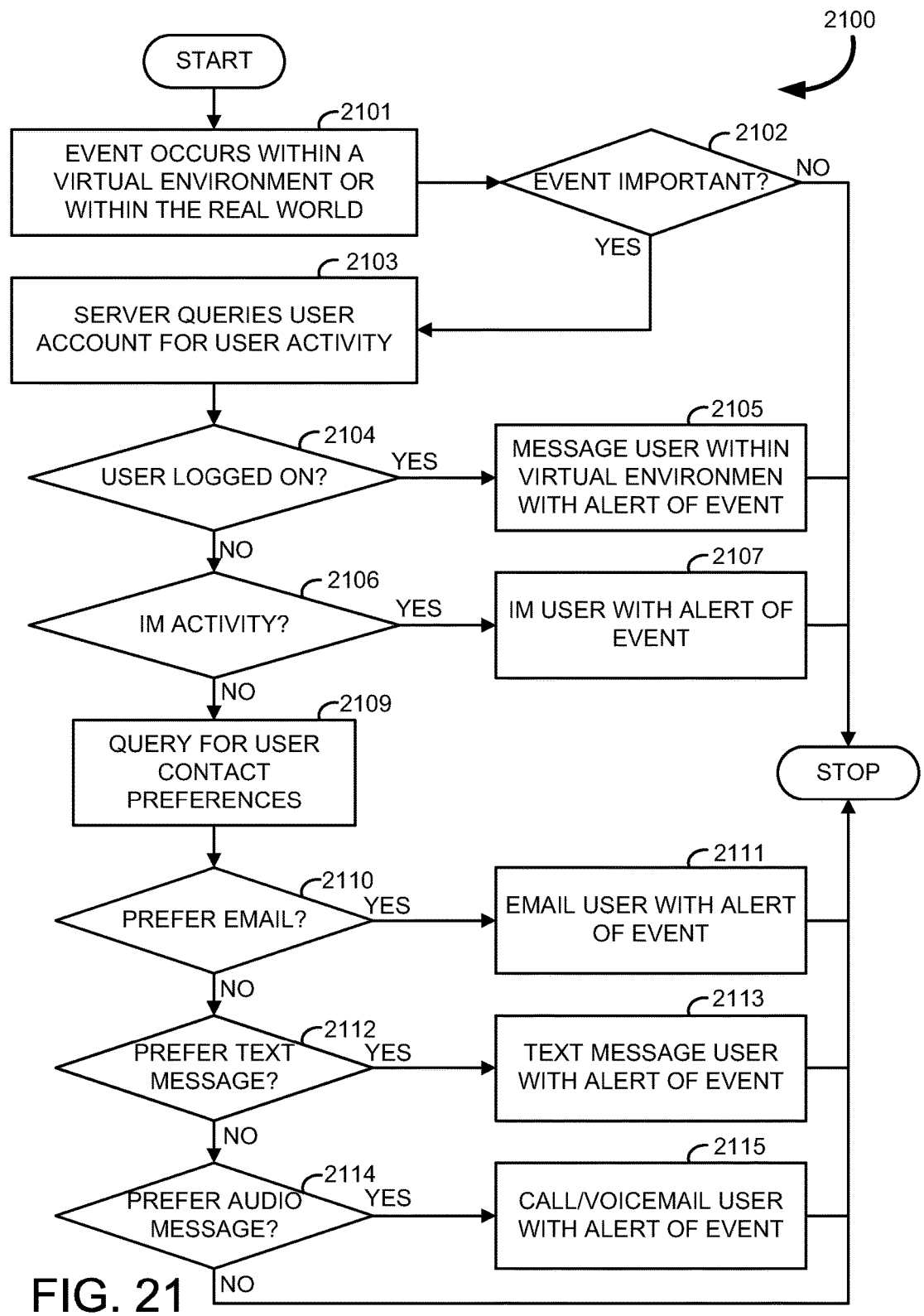
FIG. 21 shows a flow chart illustrating the process for event notification in accordance with an embodiment of the present invention.

FIG. 21 is a flow chart 2100 illustrating the process for Event Notification in accordance with an embodiment of the present invention. In this process an event occurs within a Virtual Environment 211b or within the Real World in step 1201. Examples of an event may include a response to a forum comment, a guild raid in a MMOG 203, a swing in the New York Stock Exchange, or any other event. Events are monitored for within Virtual Environments 211a to 215n and WAN APIs 170a, 170b to 170r. In step 2102, a determination is made as to whether the event is important. This determination relies heavily on the User 900 preferences stored within the User Account 424. Importance may be determined by an assessor, which assesses the scope, and duration, of an event to the User 900 or the User's Avatar 221a. The User's 900 preferences, degree of impact on User 900, scope of event, duration of event, and degree of impact on User's 900 social network, group associations, interests, physical location, and demographic data may all be utilized by the assessor to determine importance. Additionally, by incorporating a feedback system the assessor may be adaptable to the Users' desires through statistical means. In some embodiments a value may be generated for the importance of an event and the value may be compared to a threshold to determine if an event is important. If the event is found unimportant then the process ends.

Else, if the event is found important then, in step 2103, the User Account 424 is queried for User 900 activity. In step 2104, a determination is made if the User 900 is logged in. If User 900 is logged in then a message may be sent to the User 900 within the Virtual Environment 211b with an alert of the event, in step 2105.

Else, if the user is not logged in a determination is made if the User 900 is engaging in instant messaging, in step 1206. If User 900 is engaging in instant messaging then an instant message may be sent to the User 900 with an alert of the event, in step 2107.

Else, if the User 900 is not engaging in instant messaging, a query may be made into the User's 900 contact preference at step 2109. In step 2110, a determination is made if the preferred contact method is email. If email is the preferred contact method then an email of the event alert may be sent to User 900 at step 2111.

Else, if email is not the preferred contact method then, at step 2112, a determination is made if the preferred contact method is text messaging. If text messaging is the preferred contact method then a text message of the event alert may be sent to User 900 at step 2113.

Else, if text message is not the preferred contact method then, at step 2114, a determination is made if the preferred contact method is an audio messaging. If audio messaging is the preferred contact method then an audio message of the event alert may be sent to User 900 by phone or voicemail, at step 2115.

Else, if audio message is not the preferred contact method then additional methods of User 900 contact may be included, or the process may end. Alternatively, in some embodiments a default message system, such as email, may be utilized if a User 900 is found to have no contact preference.

The present invention may also be practiced with other techniques for providing a Persistent Avatar 221a with migratory abilities. For example, it is possible, to provide Users 900 with the equipment necessary to host their own Persistent Avatar 221a, including an Enabler 231 and access to large external databases, thereby distributing processing and eliminating the NOC 120. Alternatively, in some embodiments, the Enabler 231 may exist within the NOC 120, thereby coupling to the Virtual Environments 211a to 215n in its native language. Such embodiments require no cooperation from Virtual Environments 211a to 215n.

In sum, the present invention provides a persistent avatar management system 100 for the creation, editing and maintaining of avatars that are capable of migrating across multiple virtual environments while maintaining substantially constant attributes personalities and histories, thereby providing the ability to seamlessly transition from one virtual environment to another. Persistent avatar management system 100 may be implemented entirely with special purpose hardware, or a combination of hardware and software executing on a computer system. The advantages of such an efficient system include ease of working within virtual environments, reduction of man-hours wasted in alternate avatar creation, efficiency and economy for the virtual environments, and positive repercussions for the healthcare and education industries.

Although the present invention has been described in considerable detail with reference to exemplary embodiments, modifications, variations, permutations, and substitute equivalents may be made to the disclosed embodiments while remaining within the subject and spirit of the inven-

What is claimed is:

1. An autonomous persistent avatar management system for managing autonomous persistent avatars across a plurality of virtual environments, comprising:
a memory that stores computer executable components and at least one intellectual and/or emotional attribute for an autonomous persistent avatar,
wherein the intellectual attribute includes data indicative of a backstory, a history, and a memory associated with the autonomous persistent avatar, and
wherein the emotional attribute includes data indicative of an emotional disposition, a reaction algorithm, and a response algorithm associated with the autonomous persistent avatar; and
a processor that executes at least the following computer executable components stored in the memory:
a first enabler to access the at least one intellectual and/or emotional attribute and transpose the at least one intellectual and/or emotional attribute of the autonomous persistent avatar to be compatible with a user interface of a first virtual environment among a plurality of virtual environments to enable rendering of the autonomous persistent avatar in the first virtual environment using the at least one intellectual and/or emotional attribute; and
a second enabler to access the at least one intellectual and/or emotional attribute and transpose the at least one intellectual and/or emotional attribute of the autonomous persistent avatar to be compatible with a user interface of a second virtual environment among the plurality of virtual environments to enable rendering of the autonomous persistent avatar in the second virtual environment using the at least one intellectual and/or emotional attribute.

2. The autonomous persistent avatar management system, as recited in claim 1, further comprising another enabler configured to transpose the at least one intellectual and/or emotional attribute of the autonomous persistent avatar to be compatible with another interface of another virtual environment among the plurality of virtual environments thereby enabling the another virtual environment among the plurality of virtual environments to utilize the at least one intellectual and/or emotional attribute of the autonomous persistent avatar.

3. The autonomous persistent avatar management system, as recited in claim 2, further comprising a migrator configured to migrate the autonomous persistent avatar from the virtual environment among the plurality of virtual environments to the another virtual environment among the plurality of virtual environments, wherein the at least one intellectual and/or emotional attribute of the autonomous persistent avatar remains substantially consistent from the virtual environment among the plurality of virtual environments to the another virtual environment among the plurality of virtual environments.

4. The autonomous persistent avatar management system, as recited in claim 1, wherein the enabler includes at least one client module, and wherein the at least one client module is based on a protocol suite.

5. The autonomous persistent avatar management system, as recited in claim 1, wherein the autonomous persistent avatar management system is hosted within a network operation center.

6. The autonomous persistent avatar management system, as recited in claim 1, wherein the autonomous persistent avatar is associated with a user while the at least one intellectual and/or emotional attribute remains autonomous of any user, and wherein the autonomous persistent avatar management system is hosted by the user.

7. The autonomous persistent avatar management system, as recited in claim 1, further comprising an attribute generator configured to generate the at least one intellectual and/or emotional attribute of the autonomous persistent avatar.

8. The autonomous persistent avatar management system as recited in claim 7, wherein the attribute generator generates the at least one attribute from a plurality of pre-selectable attributes.

9. The autonomous persistent avatar management system, as recited in claim 1, wherein the autonomous persistent avatar further includes at least one social attribute.

10. The autonomous persistent avatar management system, as recited in claim 1, wherein the intellectual attribute of the at least one intellectual and/or emotional attribute is updated as the autonomous persistent avatar experiences events within the virtual environment.

11. The autonomous persistent avatar management system, as recited in claim 1, wherein an update to the intellectual attribute of the at least one intellectual and/or emotional attribute is rendered by another enabler of another virtual environment among the plurality of virtual environments to be compatible with a user interface of the other virtual environment.

12. The autonomous persistent avatar management system, as recited in claim 1, further comprising:
a physical attribute including any of strength data and appearance data;
wherein the enabler is configured to render the physical attribute to be compatible with the user interface of the virtual environment.

13. The autonomous persistent avatar management system, as recited in claim 1, wherein the processor is further configured to:
parse natural language components of the backstory to generate an editable grid concept-map; and
provide the editable grid concept-map to a user for editing.

14. The autonomous persistent avatar management system, as recited in claim 1, further comprising:
a personal information access broker configured to authenticate a virtual environment based on a trust ranking associated with the virtual environment to determine an access level to personal information of a user, wherein the access level is one of full access, limited access, or restricted access.

15. A method for managing an autonomous persistent avatar, the method comprising:
rendering the autonomous persistent avatar in a first virtual environment of a plurality of virtual environments using an intellectual and/or emotional attribute;
receiving attribute data indicating a change made to the intellectual and/or emotional attribute of the autonomous persistent avatar in a second virtual environment of the plurality of virtual environments;
transposing the changed intellectual and/or emotional attribute of the autonomous persistent avatar to be rendered in a format compatible with a user interface of the first virtual environment to enable rendering of the autonomous persistent avatar in the virtual environment among the plurality of virtual environments using the changed intellectual and/or emotional attribute of the autonomous persistent avatar, wherein the intellectual attribute includes data indicative of a backstory, a history, and a memory associated with the autonomous persistent avatar, wherein the emotional attribute includes data indicative of an emotional disposition, a reaction algorithm, and a response algorithm associated the autonomous persistent avatar, and wherein the at least one intellectual and/or emotional attribute of the autonomous persistent avatar is used in other virtual environments among the plurality of virtual environments.

16. The method, as recited in claim 15, further comprising transposing the at least one intellectual and/or emotional attribute of the autonomous persistent avatar to be rendered in a format compatible with another interface of another virtual environment thereby enabling the another virtual environment to utilize the at least one intellectual and/or emotional attribute of the autonomous persistent avatar.

17. The method, as recited in claim 16, further comprising migrating the autonomous persistent avatar from the first virtual environment to the second virtual environment, wherein the at least one intellectual and/or emotional attribute of the autonomous persistent avatar remains substantially consistent from the first virtual environment to the second virtual environment.

18. The method, as recited in claim 16, wherein each of the first and the second of virtual environments includes at least one of an online game, a social network, a web community, a shared simulation based on user-created content, a virtual overlay on physical world data, and a telecommunication device.

19. The method, as recited in claim 15, wherein the autonomous persistent avatar includes at least one of a character, a non-player character, a quasi-player character, an agent, a personal assistant, a personality, a guide, an educator and a representation.

20. The method, as recited in claim 19, wherein the autonomous persistent avatar is editable.

21. The method, as recited in claim 20, further comprising modifying the at least one intellectual and/or emotional attribute of the autonomous persistent avatar, wherein the modifying is triggered by an experience in one of the first and the second virtual environments.

22. The method, as recited in claim 15, wherein the autonomous persistent avatar represents a plurality of persistent avatars.

23. An autonomous persistent avatar management system for managing an autonomous persistent avatar rendered in a plurality of virtual environments, comprising:
  a memory that stores computer executable instructions; and
  a processor that executes the computer executable instructions stored in the memory, the computer executable instructions when executed by the processor causing the processor to:
    render the autonomous persistent avatar in a first virtual environment of the plurality of virtual environments using an intellectual and/or emotional attribute;
    receive attribute data indicating a change made to the intellectual and/or emotional attribute of the autonomous persistent avatar in a second virtual environment of the plurality of virtual environments;
    transpose the changed intellectual and/or emotional attribute to be compatible with a user interface of the first virtual environment; and
    render the autonomous persistent avatar in the first virtual environment using the transposed intellectual or emotional attribute.

* * * * *